(12) United States Patent
Mullin

(10) Patent No.: US 10,575,499 B2
(45) Date of Patent: Mar. 3, 2020

(54) PET TOY WITH LAYERED ARMOR AND METHOD FOR ENTERTAINING AN ANIMAL WITH THE PET TOY

(71) Applicant: MAKE IDEAS, LLC, La Jolla, CA (US)

(72) Inventor: Keith Mullin, La Jolla, CA (US)

(73) Assignee: Make Ideas, LLC, La Jolla, CA (US)

( * ) Notice: Subject to any disclaimer, the term of this patent is extended or adjusted under 35 U.S.C. 154(b) by 406 days.

(21) Appl. No.: 15/273,561

(22) Filed: Sep. 22, 2016

(65) Prior Publication Data

US 2017/0079244 A1    Mar. 23, 2017

Related U.S. Application Data

(60) Provisional application No. 62/222,172, filed on Sep. 22, 2015.

(51) Int. Cl.
*A01K 15/02*    (2006.01)

(52) U.S. Cl.
CPC .................. *A01K 15/026* (2013.01)

(58) Field of Classification Search
CPC ..... A01K 15/025; A01K 15/026; A01K 29/00
USPC .................................................. 119/707, 709
See application file for complete search history.

(56) References Cited

U.S. PATENT DOCUMENTS

| | | | |
|---|---|---|---|
| 3,445,917 A | 5/1969 | Adler | |
| 3,830,202 A * | 8/1974 | Garrison | A01K 15/025 119/709 |
| 4,611,556 A * | 9/1986 | Frank | A01K 15/024 119/706 |
| 4,825,812 A * | 5/1989 | Visalli | A01K 15/026 119/64 |
| 5,427,120 A | 6/1995 | Wong | |
| 6,174,214 B1 | 1/2001 | Cooper | |
| 6,217,408 B1 * | 4/2001 | Willinger | A01K 15/025 119/707 |
| 6,565,404 B2 | 5/2003 | Oblack | |
| 6,918,355 B1 | 7/2005 | Arvanites | |
| 7,096,826 B2 | 8/2006 | Markham | |

(Continued)

OTHER PUBLICATIONS

International Search Report and Written Opinion dated Dec. 19, 2017 in International Application No. PCT/US2017/053017.

*Primary Examiner* — Tien Q Dinh
*Assistant Examiner* — Brady W Frazier
(74) *Attorney, Agent, or Firm* — Tillman Wright, PLLC; James D. Wright; David R. Higgins

(57) ABSTRACT

The invention includes pet toys made of multiple layers of material, and more particularly, to pet toys with an exterior constructed with multiple layers assembled in an offset manner resembling protective armor. The body or core of the pet toy is made of a plurality of armor plates or pieces that overlap one another in a desired configuration to present the desired armor. A central core or spine element may serve as a threading element to secure armor plates to one another. One embodiment includes armor plates that are stacked upon one another and are therefore disposed along a longitudinal axis. Another embodiment includes armor plates that are placed laterally or side-by-side with one another to form a row, and a plurality of rows are then connected to one another. The invention also includes a method for entertaining an animal with the pet toy having the multiple layers of material.

39 Claims, 23 Drawing Sheets

(56) References Cited

U.S. PATENT DOCUMENTS

| | | | |
|---|---|---|---|
| 7,870,839 B2 | 1/2011 | Sacra | |
| 8,464,666 B2 | 6/2013 | Chefetz et al. | |
| 8,474,404 B2 | 7/2013 | Costello | |
| 2004/0216693 A1* | 11/2004 | Handelsman | A01K 15/026 119/709 |
| 2005/0045115 A1 | 3/2005 | Mann | |
| 2006/0060154 A1* | 3/2006 | Wesely | A01K 15/026 119/709 |
| 2007/0015100 A1* | 1/2007 | Morris | A61D 5/00 433/1 |
| 2009/0078214 A1* | 3/2009 | Mann | A01K 15/026 119/709 |
| 2010/0180832 A1 | 7/2010 | Krauss | |
| 2012/0090554 A1* | 4/2012 | Nunn | A01K 15/025 119/707 |
| 2013/0092097 A1* | 4/2013 | Cooper | A01K 15/026 119/707 |
| 2014/0202396 A1 | 7/2014 | Hansen | |
| 2014/0261195 A1 | 9/2014 | Reiss et al. | |
| 2014/0345532 A1* | 11/2014 | Valle | A01K 5/0114 119/51.01 |
| 2015/0000611 A1* | 1/2015 | Cooper | A63H 33/00 119/707 |
| 2015/0237829 A1* | 8/2015 | Tsengas | A01K 15/025 119/709 |
| 2016/0113243 A1 | 4/2016 | Mullin et al. | |

* cited by examiner

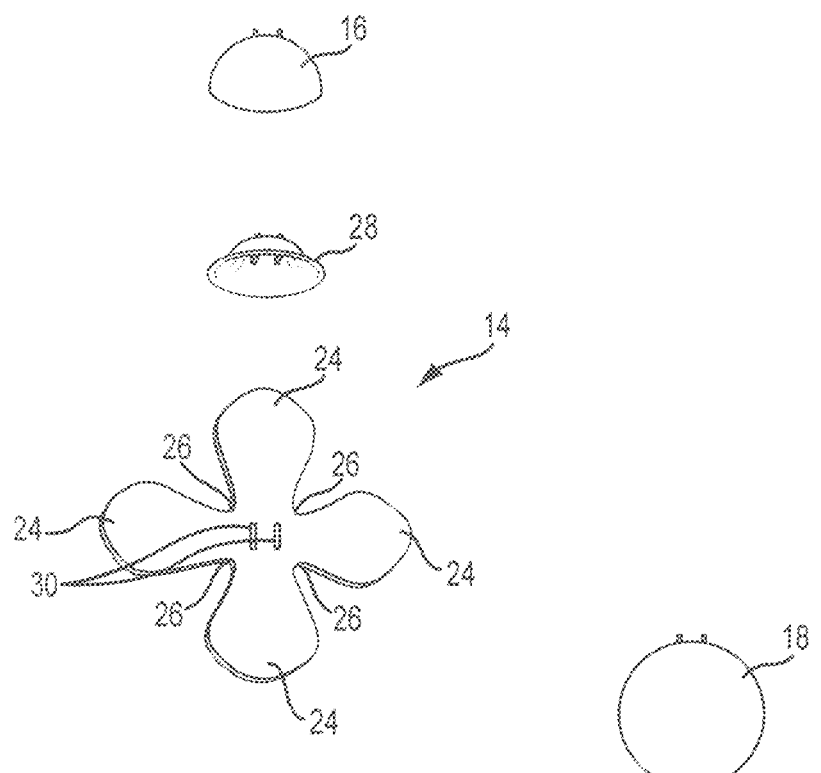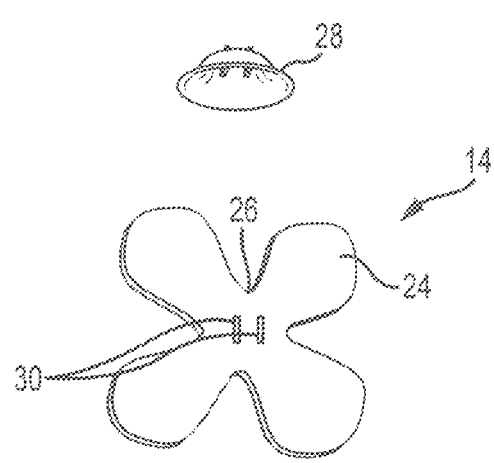
FIG.4
FIG.5

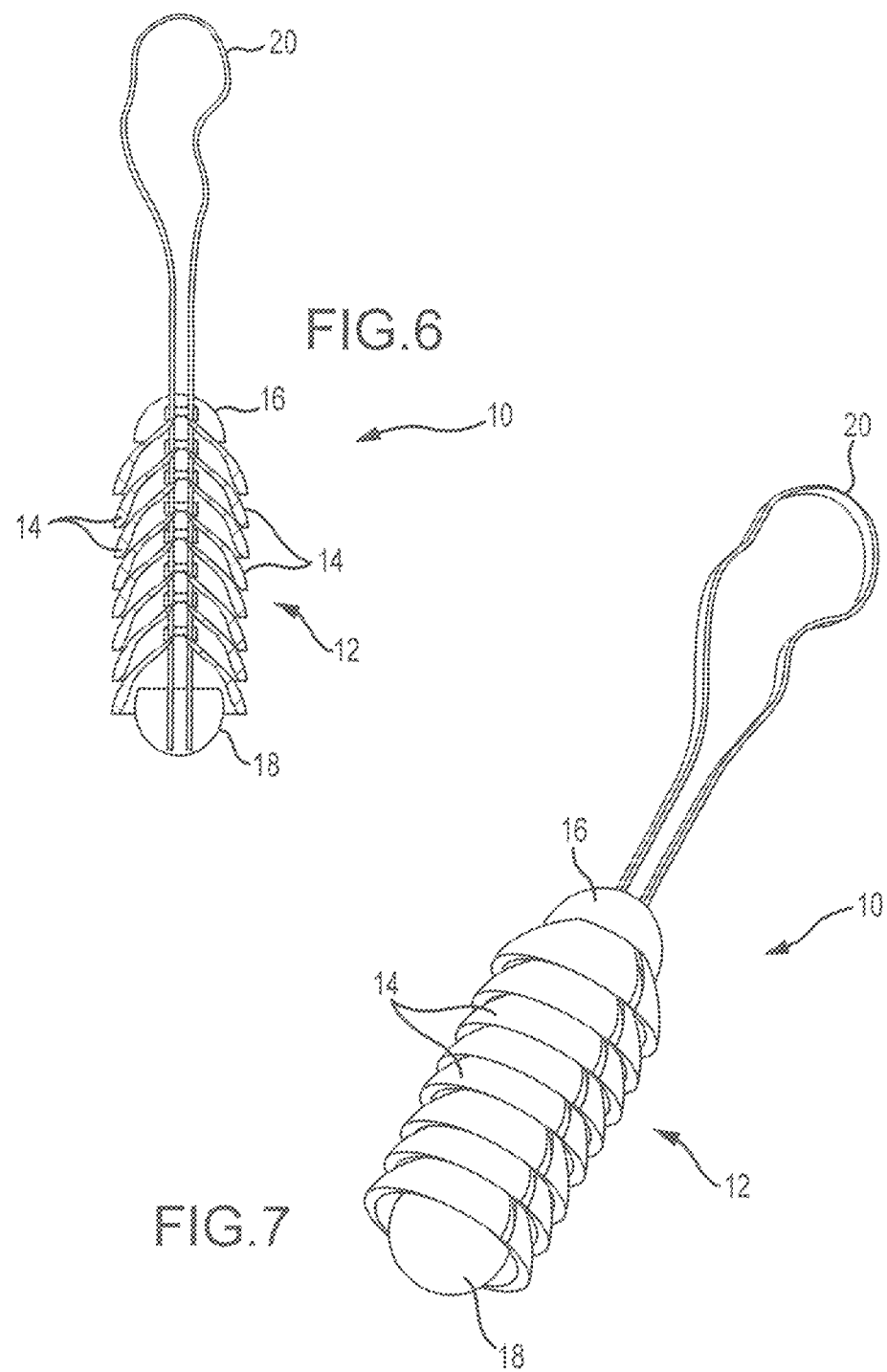

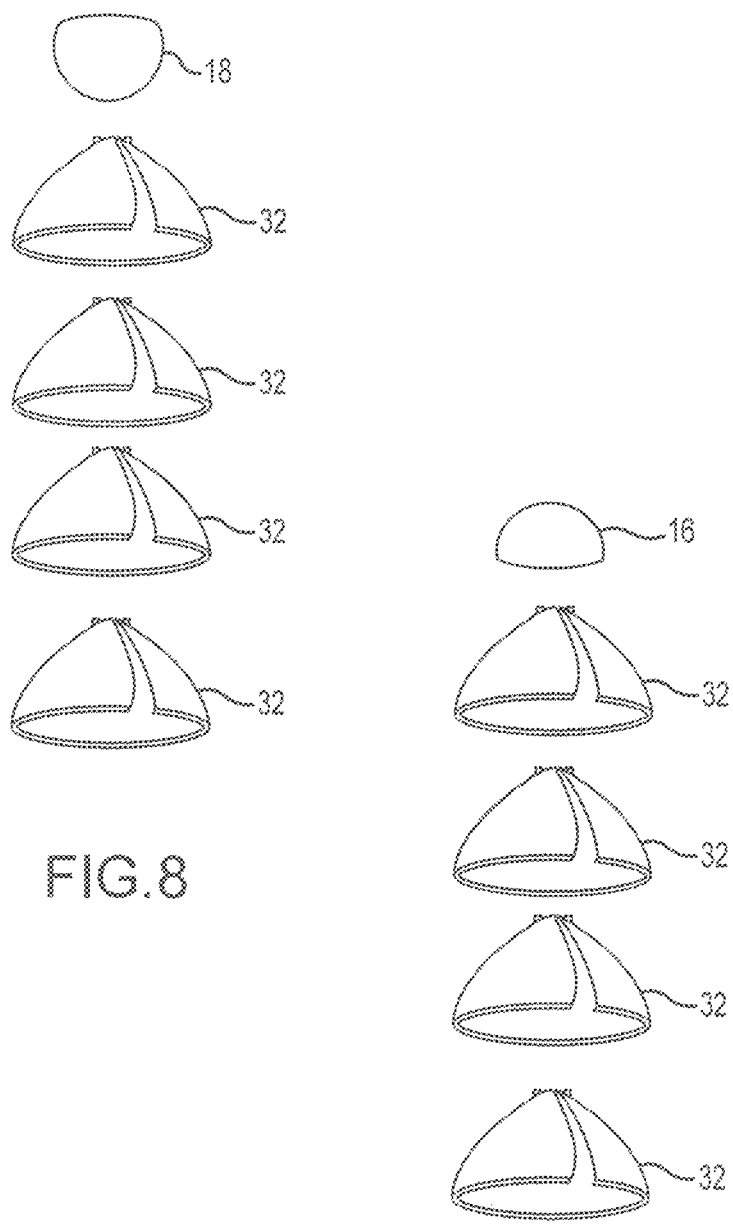

PET TOY WITH LAYERED ARMOR AND METHOD FOR ENTERTAINING AN ANIMAL WITH THE PET TOY

CROSS-REFERENCE TO RELATED APPLICATIONS

This application claims priority under 35 U.S.C. § 119(e) to U.S. Provisional Patent Application Ser. No. 62/222,172, filed Sep. 22, 2015, which is incorporated herein in its entirety by reference.

FIELD OF THE INVENTION

The invention relates to pet toys made of multiple layers of material, and more particularly, to a pet toy with an exterior constructed with multiple layers configured in an offset configuration resembling protective armor, along with a method for entertaining an animal with the pet toy having the multiple layers of material.

BACKGROUND OF THE INVENTION

Domesticated animals, to especially include dogs, are known to exhibit negative behaviors in the absence of proper exercise and mental stimulation. Pet toys are provided for animals for various reasons, and two main reasons are to stimulate physical activity and mental stimulation for the animal. Stimulation can help to prevent destructive chewing behaviors. Veterinary science also concludes that in addition to behavioral problems, dogs are more susceptible to disease since the animal's immune system may weaken due to stress or depression.

There are a number of different types of commercially available pet toys. One general category of at toys includes those which dispense treats so the animal may enjoy not only the characteristics of the toy, but also the reward of a treat. Another general category of toys includes "plush" toys which may be made from various types of cloth or fabric. These plush toys may provide a relatively soft and flexible medium for dogs to chew. The center of the plush toy may include a core made of stuffing, fiber, or foam. Yet another general category of toys includes those made from synthetic or natural rubber and which are specifically designed to allow chewing of the toy in which the elastomeric nature of the toy, sometimes prevents it from being perforated or torn by the biting action of the animal.

There are many drawbacks for traditional pet toys. For treat dispensing toys, treats can only be dispensed as long as the toy is sufficiently loaded with treats. Therefore, those toys which allow for a high dispense rate may not capture the attention of the animal for a reasonable period of time. For plush toys, these are particularly susceptible to being easily damaged by the chewing and biting action of the animal in which an animal's teeth perforate the exterior cover or epidermis of the toy and/or stitching which may hold the exterior covering together. Once the exterior cover is compromised, the animal made them more easily destroy the central core. For rubber pet toys, despite the claims of many pet manufacturers as to their durability, most rubber pet toys become perforated and subsequently ripped into pieces by the continual biting and aggressive chewing action of the animal.

Considering the various defects of the prior art there is still a need for a pet toy that is durable and has sufficient features which may occupy the animal for an extended period of time. There is also a need for a pet toy that is relatively simple in construction and therefore economical as a commercial product.

SUMMARY OF THE INVENTION

According to a first preferred embodiment of the invention, a pet toy is provided with an outer or exterior made of a flexible material such as fabric and configured with interlocking or layered pieces of material to provide the appearance of an "armored" exterior surface. The interlocking or layered pieces are secured by an interior core or spine in which the pieces are progressively attached to the core or spine to create a desired armored configuration. The term "armor" or "armored" as used to describe the exterior surface of the pet toy means at least two layers of flexible material disposed on the exterior of the pet toy in which one layer partially overlaps an underlying layer or in the alternative, one layer is partially covered by an overlying layer. The layered armor is comprised of individual plates or pieces that are assembled to provide single or multiple areas of protection on the exterior surface of the pet toy.

The flexible material for use on the exterior surface of the toy may include a plurality of similar or different shaped armor plates or pieces that are mounted to the interior core such that the interior core generally forms a longitudinal axis for a body of the pet toy. The core passes through a central opening in each of the armor pieces so that when the pet toy is assembled, the armor pieces of material forming the overall armored exterior are stacked upon one another, side-by-side, along a selected length of the core. The number, size and shape of armor pieces or plates over a given length of the core may be modified to provide a desired thickness and density for the body of the pet toy.

The interior core or spine may comprise a plurality of longitudinally extending plastic members which passed through the center areas of the armor pieces and in such a case, the armor pieces have a plurality of openings to receive the plastic members. Alternatively, the interior core may include a flexible piece such as rope, nylon, or cloth that is used to secure the armor pieces. Alternatively, the interior core may be comprised of thread which creates a stitching mass of thread material when the armor plates are stitched together. Additional elements may be provided in the interior core to create a desired shape or desired rigidity/flexibility for the toy. These additional elements may include foam, plastic inserts, shaping collars, and supporting rods, alone or in combination.

According to another embodiment of the invention, the armored exterior of the pet toy may be configured similar to plate armor used for personal protection, in which a plurality of armor pieces or lames are provided as components of a larger section of plate armor to be assembled. Each of the armor lames may be connected to one another to form an articulated armor exterior that provides flexible protection for the underlying core of the pet toy.

The interior core forms a base or foundation structure to attach the layered armor. The interior core may further include base stops at both ends of the interior core that function to hold the layered armor pieces on the element to which the pieces are mounted. Specifically, the base stop elements may be the most outer or last elements attached to the interior core at both ends thereof.

The armor pieces can be made of a number of different types of material to include fabric, cloth, nylon, warp knitting, flexible rubber, PVC, TPC, plastic, thermoplastic elastomer, thermoplastic rubber, leather, hide, cotton, or any other rigid or flexible material which can be arranged in layers to form the exposed outer surface of the pet toy. The armor pieces may be made from combinations of these materials as well.

The armor pieces or lames may be configured according to any construction method of armor plating to include lamellar armor, scale armor, laminar armor, radial armor, collard armor, or terminus armor construction methods, or combinations of these methods. The layered armor is constructed in a desired layered configuration to provide increased protection for the toy from the destructive forces from animal biting and use.

The armor pieces may be further described as being in the shape of petals or plates as further described herein. Each armor piece has at least one combination of an extension or protrusion and a slot or recess. The extension/protrusion of one armor piece may occupy the gap formed by the slot or recess of an overlying or underlying armor piece thereby providing the partially overlapping configuration. Alternatively, the extension/protrusion of one armor piece may partially cover the extension/protrusion of an overlying or underlying armor piece.

According to one preferred embodiment, the layered armor may be constructed by threading a plurality of armor pieces on a spine core element. In this specific example, a radial armor configuration may be formed as discussed in further detail herein.

Optionally, a plurality of threaded shaped washers may be secured to the spine core element. The threaded shaped washers are used to assist in holding the armor pieces in a particular shape or orientation with respect to one another. Stated another way, the washers may be used to hold the armor pieces in a desired shape and position. In order to hold the washers and armor pieces in a uniform and spaced orientation from one another on the spine core element, the spine core element may be similar to a zip tie, and each of the washers may include a one-way locked thread such that movement of the washers on the threaded spine core are limited to advancement in one direction. The washers may be provided between each armor piece, or the washers may be placed between multiple groups or sets of armor pieces, the goal being to provide enough washers so that a consistent or uniform plating configuration is achieved in which there is substantially uniform overlapping of armor pieces along the length of the pet toy.

According to the radial armor method, a plurality of armor pieces or plates threaded on a spine core provide protection on all sides of the pet toy and therefore, the assembled armor pieces may be considered radial armor. According to one method of construction, each of the armor plates may include a plurality of openings formed in the center areas thereof, and the spine core includes a plurality of corresponding spine elements. As each armor plate is threaded onto the spine elements, each successive plate is rotated so as to create an offset position as compared to the previously threaded plate. Therefore, a progressive and successive armored configuration is achieved. According to another method of construction, the spine core may only include two spine elements and the armor plates each have holes in different positions such that when selected plates are threaded onto the spine elements, the plates are then offset because of the different hole locations. According to yet another method of construction, the overlapping armored configuration may be achieved by incorporating armor plates that have different shapes and sizes. The armor plates are selectively attached to the interior core such that there is successive and partial overlap of armor plates along a desired portion of the body of the pet toy. This method of construction may be referred to as the lamellar or scale method. According to yet another method of construction, a collared assembly may be adopted in which there is a single central core element and a plurality of armor collar plates are threaded over the central core element. The central core element in this embodiment may be substantially larger with a greater diameter than the spinal core element(s) of the prior embodiments. Accordingly, the armor collar plates have larger center openings to receive the central core element. The armored configuration here may be achieved by the armor plates having different shapes or outer diameters, or combinations thereof. Alternatively, the armor collar plates may have shapes which traverse a selected radial angle to achieve the desired overlap between armor plates; for example, some of the collar plates may traverse 360° while others may traverse 180° with reference to an angle being measured from the central core element.

According to yet another embodiment, the layered armor can be assembled without a central core or spine core. This layered armor method is referred to herein as the terminus method. This method can be achieved by selling, threading, or otherwise tying ends of each armor plate together in a successive manner so that various armor plate shapes are positioned in the desired offset configuration. This method may also be achieved by thru-looping the ends of the armor plates as discussed herein. Optionally, shaped washers may also be used to render the armor in a desired armored shape or configuration.

According to yet another embodiment, the pet toy may comprise a plurality of armored sections, each of which make up a portion of the toy. For example, one armored section may be constructed resembling the body of an animal, while other armored sections may be Incorporated which resemble the legs of an animal. Accordingly, the armored sections may be connected to one another to form the pet toy.

According to yet another embodiment, the pet toy may comprise one or more armored sections along with other elements which make up the remainder of the pet toy. For example, an armored section can be used for the body of the toy, while non-armored sections to be used for the legs, head, tail, etc. The non-armored sections can be made from selected materials such as cloth, fabric, warp knitting, TPC, nylon, PVC, plastic, thermoplastic elastomer, thermoplastic rubber, or any other material.

According to yet another embodiment, the pet toy may comprise one or more armored areas that are made from one piece of flexible material and sewn or stitched together in a layered or armored configuration. The stitching of the material in a layered format can occur on the central core element, the body, or upon itself (without the central core) to form the shape of the armored pet toy.

Considering the above described features and attributes of the invention, in one aspect, the invention may be considered a pet toy comprising: a body having an armor section, said armor section including a plurality of armor plates; a central core element extending through said body and oriented in a longitudinal direction; at least one retaining block for securing one end of said armor section to said core element; and wherein said armor plates are successively secured to said core element thereby arranging said armor plates in a stacked arrangement, and further wherein each of said armor plates includes a plurality of petals and recesses formed between pairs of petals such that when said pet toy is assembled, petals of one armor plate partially overlap petals or recesses of an adjacent armor plate.

According to this first aspect of the invention, other aspects may include, wherein said armor plates each include the plurality of petals spaced circumferentially from one another, and said armor plates further including a center area with at least one opening to receive said central core element; wherein said central core element includes a plurality of spines each extending in the longitudinal direction; wherein said central core element is a flexible elongate member; wherein said armor plates are arranged to form a substantially tubular shape in which the armor plates circumferentially surround a selected length of said body; wherein said body further includes at least one shape washer connected to said central core and placed between two armor plates; wherein said shape washer has a curved shape to induce alignment of said armor plates in a desired orientation; further including at least one accessory secured to said pet toy, said accessory being made of a selected material to supplement said body; and wherein said central core includes a directionally restricted element enabling advancement of said armor plates in a single direction and to prevent said armor plates from being advanced in an opposite direction when assembled to said central core. The shape washer can be made of rigid or flexible material and can be fixed to the central core or installed without a connection and held in place by the two armor plates on either side of the shape washer.

According to another aspect of the invention, it may be considered a method of entertaining an animal with a pet toy, comprising providing a pet toy comprising: (a) a body having an armor section, said armor section including a plurality of armor plates; (b) a central core element extending through said body and oriented in a longitudinal direction; (c) at least one retaining block for securing one end of said armor section to said core element; wherein said armor plates are successively secured to said core element thereby arranging said armor plates in a stacked arrangement, and further wherein each of said armor plates includes a plurality of petals and recesses formed between pairs of petals such that when said pet toy is assembled, petals of one armor plate partially overlap petals or recesses of an adjacent armor plate; giving the pet toy to an animal wherein potential damage to the toy caused by the biting action of the animal's mouth on the body is reduced by the plurality of armor plates.

Other aspects of this second aspect of the invention may include: wherein said armor plates each include the plurality of petals spaced circumferentially from one another, and said armor plates further including a center area with at least one opening to receive said central core element; wherein said central core element includes a plurality of spines each extending in the longitudinal direction; wherein said central core element is a flexible elongate member; wherein said armor plates are arranged to form a substantially tubular shape in which the armor plates circumferentially surround a selected length of said body; wherein said body further includes at least one shape washer connected to said central core and placed between two armor plates.

According to another aspect of the invention, it may be considered a pet toy comprising: a body having an armor section, said armor section including a plurality of armor plates, each of said armor plates having at least one protrusion such that when said pet toy is assembled, said armor section presents a multiple layers of material on an exterior surface of said pet toy as formed by a protrusion of one armor plate overlapping at least a portion of an adjacent armor plate; a central spine extending through said body and oriented to secure said armor plates thereto; and wherein said armor plates are secured to said central spine thereby arranging said armor plates in a configuration to extend said armor section along a predetermined length of said body and to circumferentially surround said body a predetermined angular coverage.

According to this third aspect, other aspects of the invention may include: at least one retaining block attached to said central spine and arranged to secure one end of said armor section to said central spine wherein said at least one protrusion of said armor plates is a plurality of petals spaced circumferentially from one another, and said armor plates further including a center area with at least one opening to receive said central spine; wherein said central core element includes a plurality of spines each extending in the longitudinal direction; wherein said central spine is a flexible elongate member; wherein said armor plates are arranged to form a substantially tubular shape in which the armor plates circumferentially surround a selected length of said body; wherein said body further includes at least one shape washer connected to said central spine and placed between two adjacent armor plates; wherein said shape washer has a curved shape to induce alignment of said armor plates in a desired orientation; further including: at least one accessory secured to said pet toy, said accessory being made of a selected material to supplement said body; and wherein said central spine includes a directionally restricted element enabling advancement of said armor plates in a single direction and to prevent said armor plates from being advanced in an opposite direction when assembled to said central spine.

Other features and advantages of the invention will become apparent from a review of the following drawings taken in conjunction with the detailed description.

BRIEF DESCRIPTION OF THE DRAWINGS

FIG. 4 is an exploded perspective view of selected components of the first embodiment;

FIG. 5 is an exploded perspective view of other selected components of the first embodiment;

FIG. 6 is a cross-sectional view of a second embodiment of the invention;

FIG. 7 is another perspective view of the second embodiment;

FIG. 8 is an exploded perspective view of selected components of the second embodiment;

FIG. 9 is an exploded perspective view of other selected components of the second embodiment;

DETAILED DESCRIPTION

Figure 1:
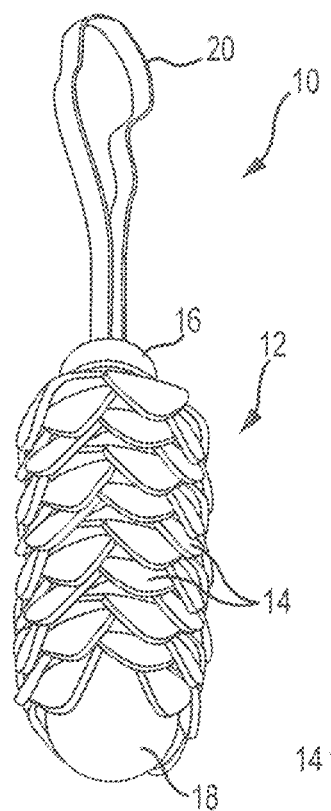
FIG. 1 is a perspective view of a first embodiment of the invention.
Figure 2:
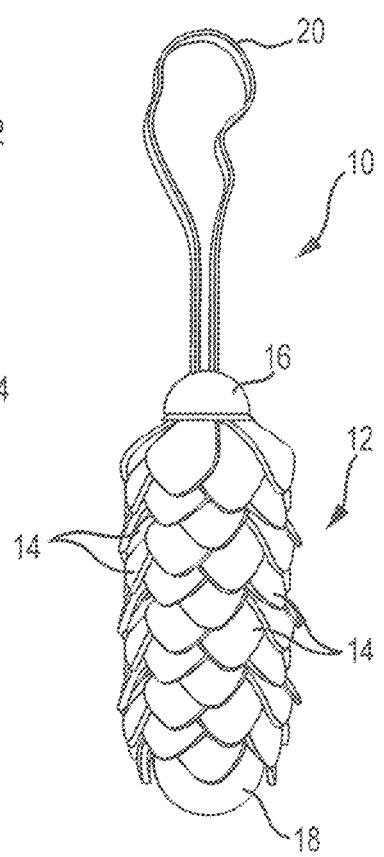
FIG. 2 is another perspective view of the first embodiment.
Figure 3:
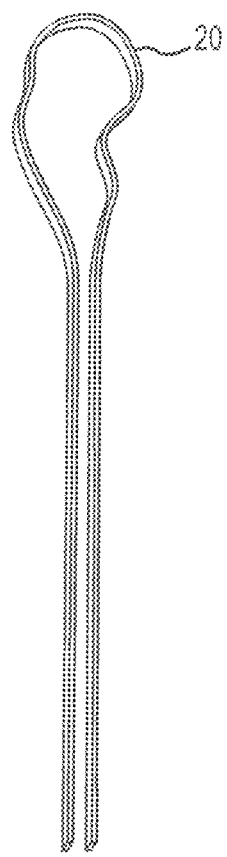
FIG. 3 is a perspective view of an interior core or spine element.

FIGS. 1 and 2 illustrate a first embodiment of the invention, namely a pet toy 10 with armored features. The pet toy is generally elongate shaped with a central body 12 that incorporates an armored section. The armored section is made up of a plurality of armor plates or pieces 14. As shown, each armored plate has a projection that partially overlaps at least one other underlying or overlying armor plate, thereby presenting a layered configuration which results in a plurality of layers of material along each portion of the body 12. One end of the toy includes a top block 16 which is used to capture and hold one end of the body with armor plates, and another option in the toy includes a bottom block 18 which is used to capture and hold the opposite end of the body. The armor plates 14 are secured to one another by being threaded upon a flexible core or flexible retainer 20. As shown, the flexible cord core 20 is folded in half such that there are two interior spines which are routed through openings in the armor plates, as discussed further below. FIG. 3 shows a perspective view of the interior core or spine element.

FIG. 4 illustrates further details of the embodiment of FIGS. 1 and 2. Specifically, this figure illustrates one of the armor plates 14 that has a plurality of petals 24, and each of the petals being separated by a corresponding recess 26. Accordingly, there is a gap or space between each of the petals 24. FIG. 4 also illustrates the top block 16 which is shown as a semi-spherical shaped element, along with a shape washer 28. The shape washer is used to help maintain a desired shape for the plurality of armor plates. In the preferred embodiment of FIG. 1, the armor plates are configured so that they each have petals which are oriented in the same general direction towards the bottom of the pet toy as viewed from FIG. 1. Accordingly, the shape washer 28 may also be cup or partially spherical shaped to help orient the petals in the desired direction.

FIG. 5 also illustrates further details of the embodiment of FIGS. 1 and 2, and similar to, but showing the bottom block 18. The bottom block is illustrated as a generally spherical shaped element.

FIGS. 6 and 7 illustrate another embodiment of the invention. The same reference numerals used in this embodiment are used to illustrate similar or the same structure as the first embodiment. This embodiment shows a pet toy 10 with a body 12, a plurality of armor plates/pieces 14, a top block 16, a bottom block 18, and a flexible core or retainer 20. The primary difference in this embodiment as compared to the first embodiment is the specific shape of the armor plates. In connection therewith, reference is made to FIGS. 8 and 9 in which the top and bottom blocks 16 and 18 are shown along with a plurality of armor plates 14 having "hoop skirt" shapes. Stated another way, the armor plates have a closed curved outer surface 32 that increases in diameter towards one direction, and terminating at one end with an opening. The opposite end has a comparatively smaller opening. As can be appreciated from FIGS. 6 and 7, the progressive stacking of the skirt shaped armor plates results in partial overlap of the armor plates which provide multiple layers of protection for the underlying interior core of the pet toy. Each of the armor plates may have a different diameter opening to present an irregular surface, or the diameter of the openings may be uniform as shown in FIGS. 6 and 7.

Figure 10:
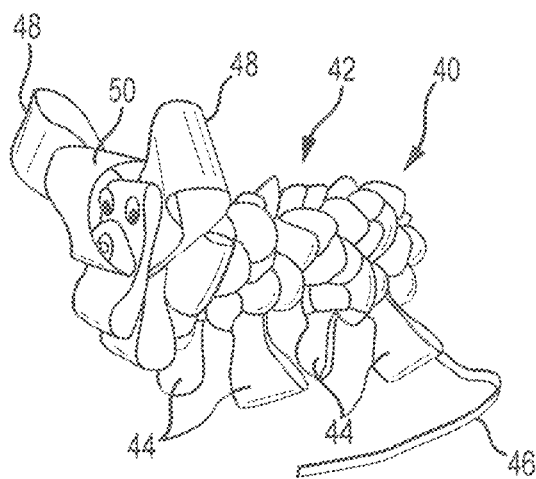
FIG. 10 is a perspective view of a third embodiment of the invention.

FIG. 10 illustrates another preferred embodiment of the invention. In this embodiment, the pet toy 40 resembles an animal such as a lion. The pet toy 40 includes a body armor section 42, and a plurality of ornamental features to include legs 44, a tail 46, ears 48, and a head 50 with additional ornamentation to represent the eyes, nose, mouth, etc. of the animal. The ornamental features can be made from fabric or another desired material. It should be understood that any type of animal, creature, whimsical character, or selected figure could be created with ornamental features or accessories attached to one or more armor.

Figure 11:
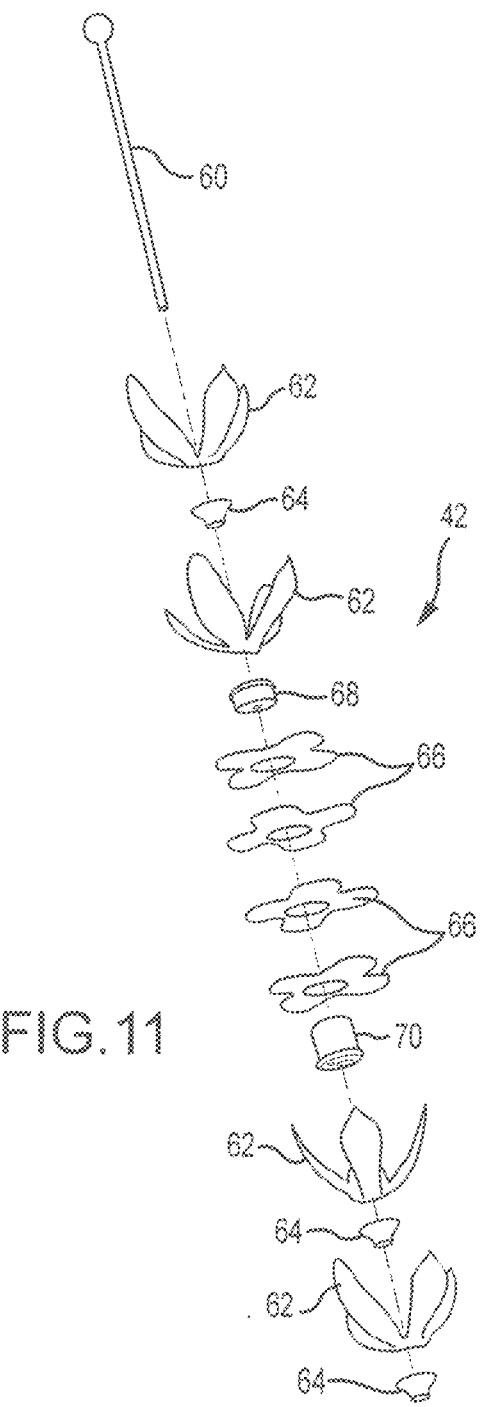
FIG. 11 is an exploded perspective view of the core or body portion of the third embodiment.

FIG. 11 is an exploded perspective view of the components of the body armor section 42. As shown, the body includes a single interior spine 60 over which is threaded a plurality of components. These components include ornamentation 62, shape washers 64, armor plates 66, a top block 68, and a bottom block 70. The ornamentation 62 can also be configured as additional armor plates in which a desired overlap may be achieved with the petals or protrusions of the ornamentation.

Figure 11A:
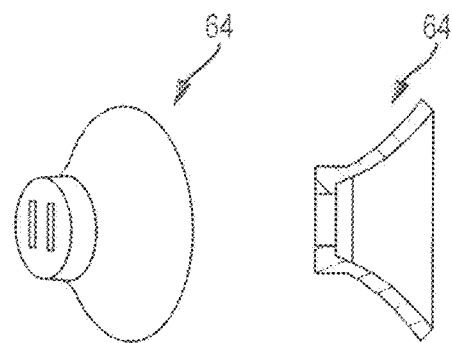
FIG. 11A is a perspective view of one component of the third embodiment.
Figure 11B:
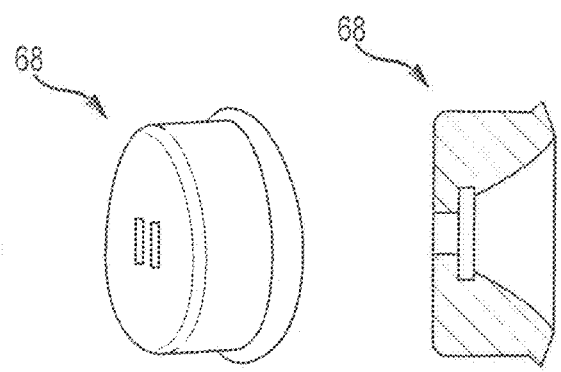
FIG. 11B is a perspective view of another component of the third embodiment.
Figure 11C:
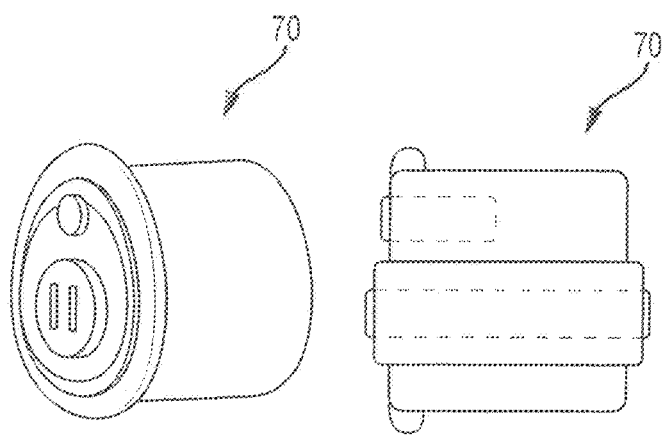
FIG. 11C is a perspective view of yet another component of the third embodiment.

FIG. 11A provides a perspective view and a cross-sectional view of a shape washer element 64. As shown, the washer element includes two openings to receive a central spine. FIG. 11B provides a perspective view and a cross-sectional view of a top block 68. As with the shape washer 64, the top block 68 also has two openings to receive a central spine. FIG. 11C provides a perspective view and a cross-sectional view of a bottom block element 70 and again, this element has two openings to receive a central spine. It should be understood however that these elements in FIGS. 11A, B, and C may be configured with a different number of openings to accommodate the particular type of central core element which is used.

Figure 12:
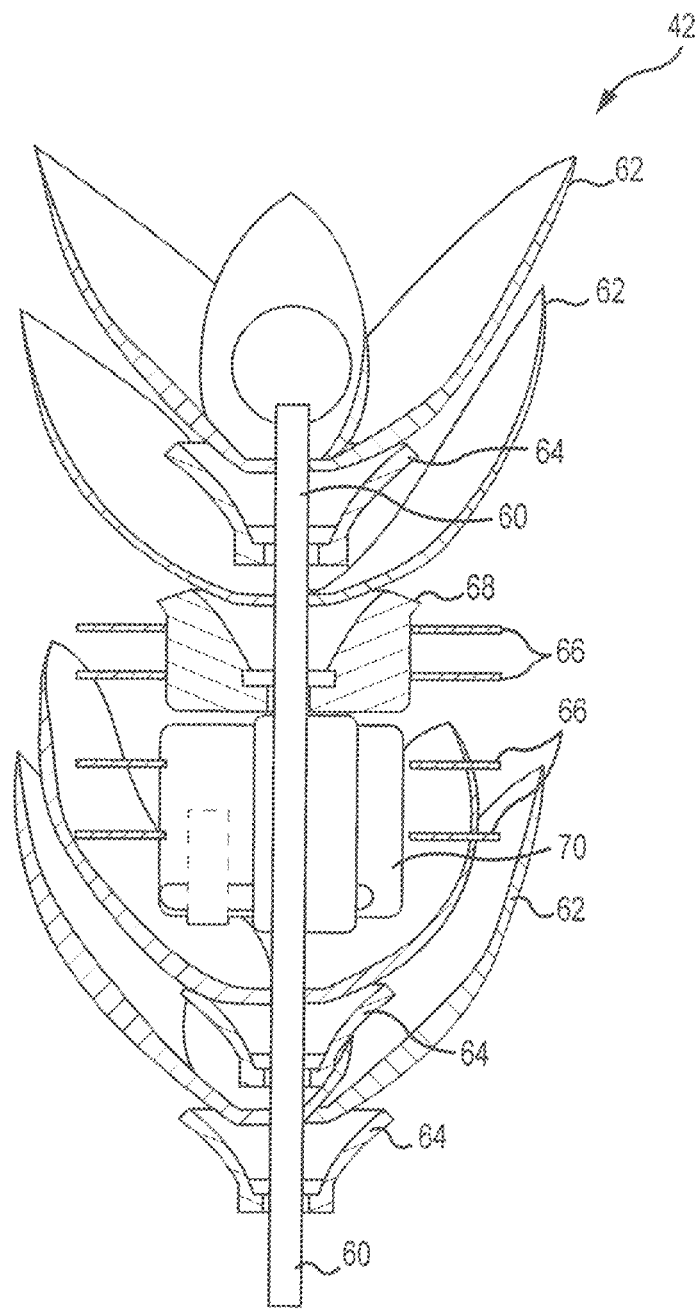
FIG. 12 is a cross-sectional view of the core or body of the third embodiment illustrating how the components of the core are assembled.

FIG. 12 is a partial cross-sectional view of the assembled body section 42. As shown, each of the elements are fastened or secured to the interior spine 60 and are effectively spaced from one another.

Figure 13:
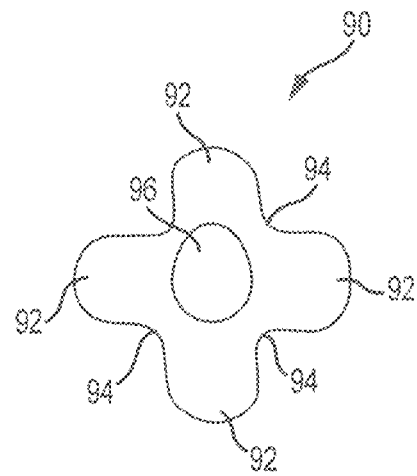
FIG. 13 is a plan view of example armor plates or pieces.

FIG. 13 illustrates one example shape for an armor plate 90. Specifically, the armor plate 90 includes a plurality of petals 92, recesses 94, and a single central opening 96.

Figure 14:
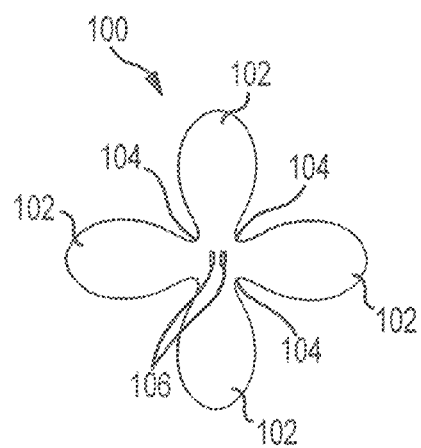
FIG. 14 is a plan view of other example armor plates or pieces.

FIG. 14 illustrates another example shape for an armor plate 100. This armor plate 100 also includes petals 102, recesses 104, but a pair of central openings 106.

FIGS. 13 and 14 are intended to illustrate example shapes for armor plates, but it should be understood that armor plates can be selected with a greater number of or a fewer number of petals, may have different sized or shaped central openings, as well as different individually shaped petals.

Figure 15:
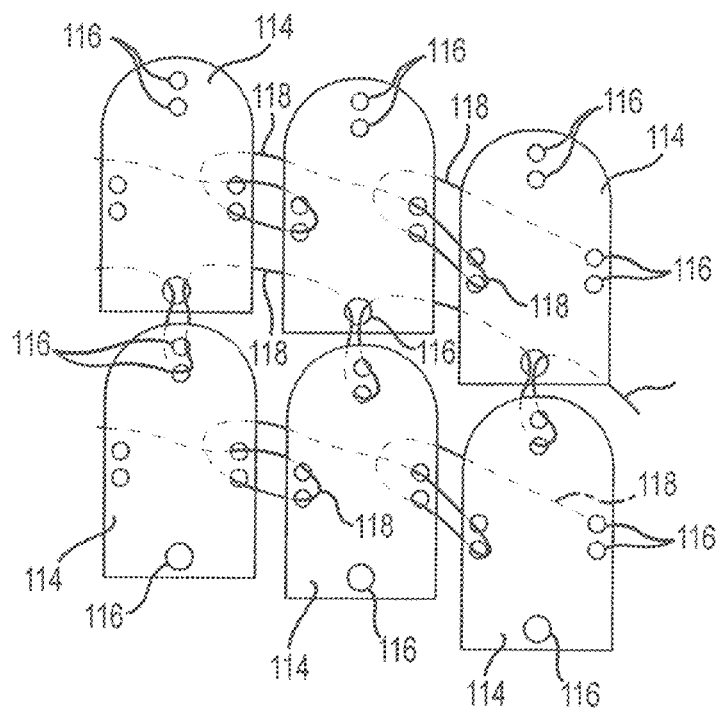
FIG. 15 is a schematic view of armor plates or pieces to be connected to one another in order to form lamellar armor that may be used in connection with any of the embodiments of the invention.
Figure 16:
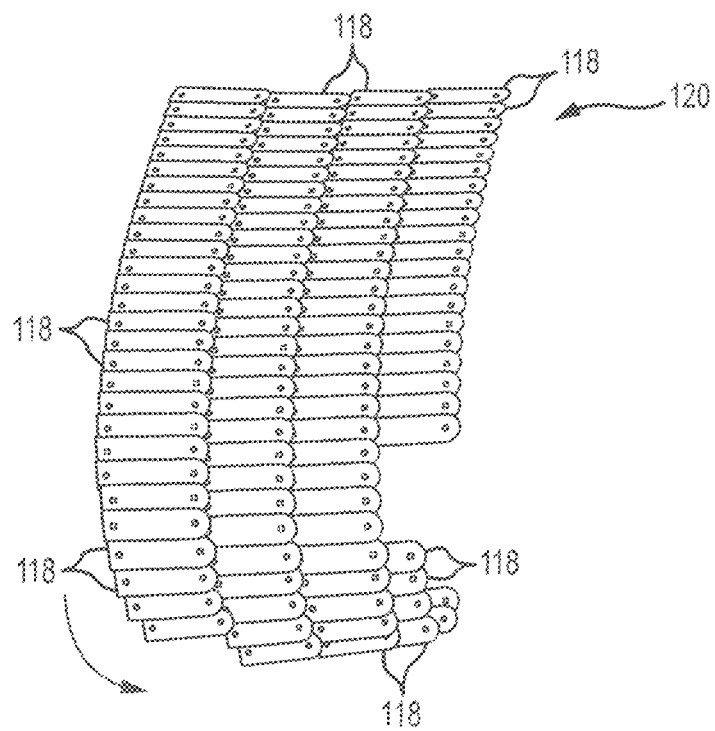
FIG. 16 is another schematic view of lamellar armor section when assembled.

FIGS. 15 and 16 illustrate another configuration or aspect of the armor plates of the invention. In this configuration, the armor plates 114 have a plurality of holes 116 that are disposed along the periphery or edges of the armor plates. One or more pieces of securing material 118 such as wire, string, or nylon, are threaded through the holes 116. The particular configuration of armor plates of FIG. 15 results in an armored lamellar plate section 120 shown in FIG. 16. Specifically, FIG. 16 illustrates a plurality of rows of armored plates 114 which are disposed side-by-side or laterally from one another, and also a plurality of rows which partially overlap one another in a longitudinal or orthogonal direction.

Figure 17:
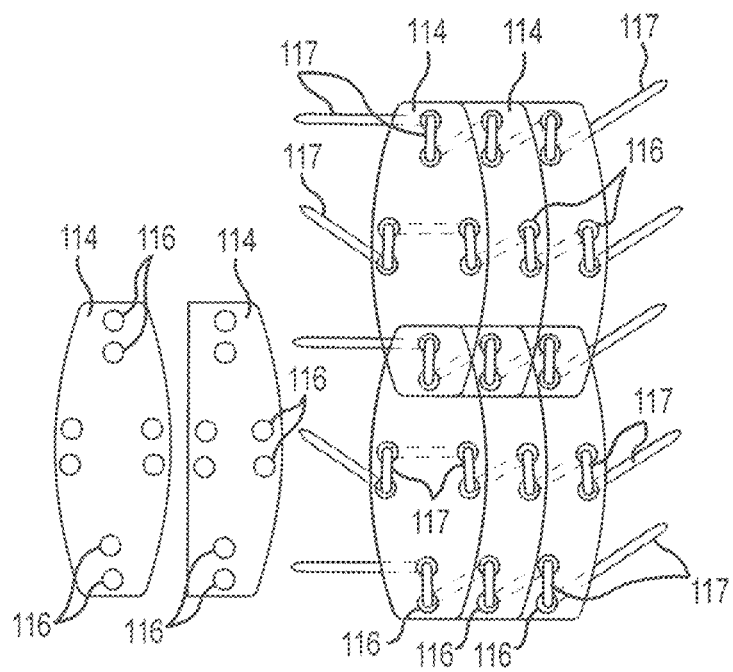
FIG. 17 is a schematic view of another example of lamellar armor.

FIG. 17 illustrates another example of a lamellar armor section comprising a plurality of armor plates 114 with openings 116 disposed at desired locations along the edges of the plates, along with one or more securing elements. In this example, the securing elements are a plurality of flexible members 117 such as cords or wires which are selectively routed through the openings 116 as shown. Some of the securing elements 117 are exposed.

Figure 18:
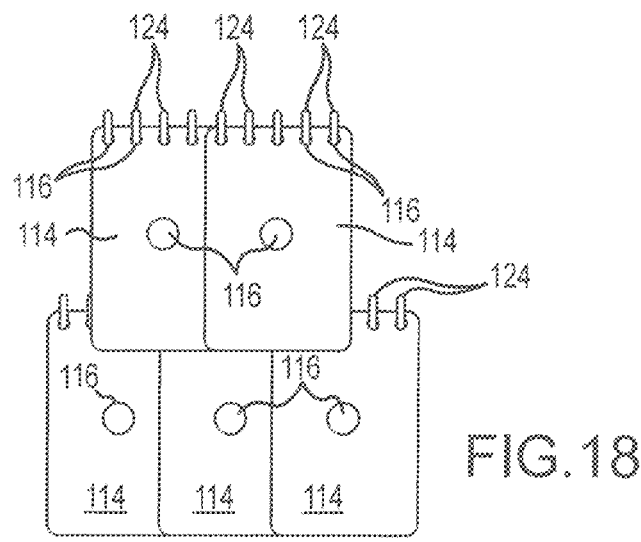
FIGS. 18-20 are schematic views of yet another example of lamellar armor.
Figure 20:
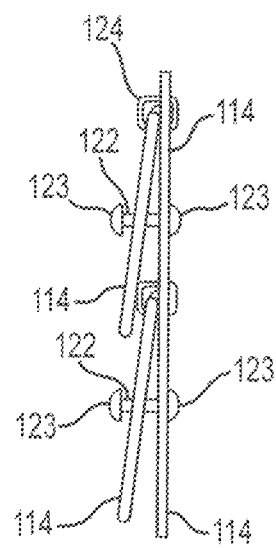
Figure 19:
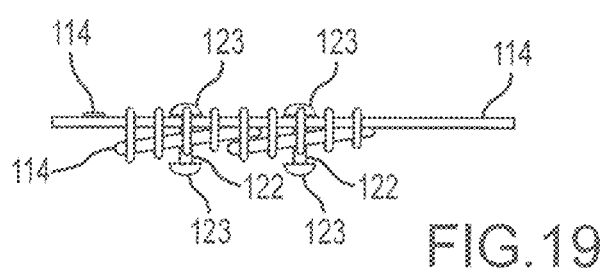

FIGS. 18-20 illustrate yet another example of a lamellar armor section comprising a plurality of armor plates 114 with openings 116. In this example, the securing elements are in the form of pins 122 and channels 124. As best seen in the side views of FIGS. 19 and 20, the pins 122 have heads 123 which secure layers of armor plates 114 in which an underlying layer of armor plates is partially covered by an overlying layer of armor plates that are suspended forward and outwardly. More specifically, the overlying layer of armor plating includes armor plates with an upper and end received in a corresponding upper channel 124, and a lower end which rests upon a corresponding lower channel 124.

Figure 21:
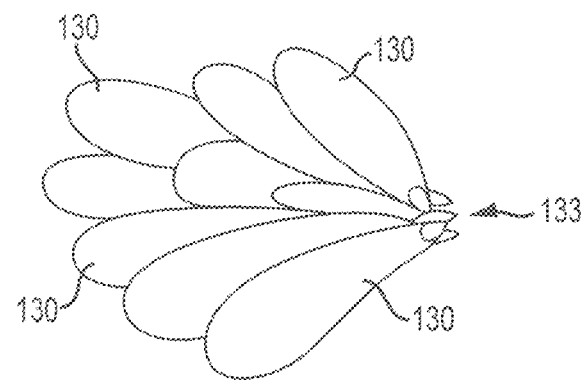
FIGS. 21-23 are schematic views of example terminus armor sections that may be used in connection with any of the embodiments of the invention.
Figure 22:
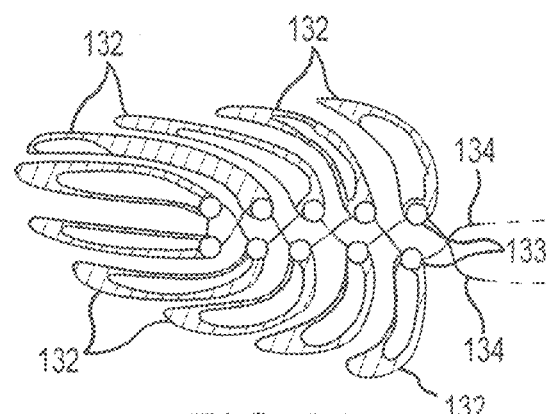
Figure 23:
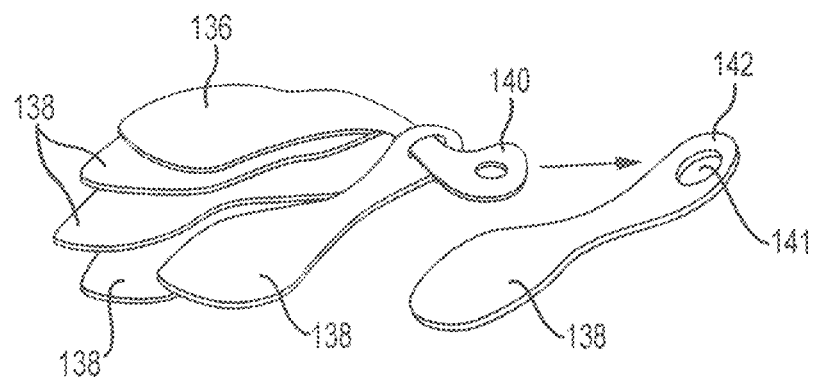

FIGS. 21-23 illustrate the terminus method of construction for armor plates. More specifically, these figures illustrate different shaped armor plates 130 that do not require a central core or spine element. In the example of FIG. 21, the armor plates 130 are connected to one another at their apexes 133 by stitching, stapling or tacking each apex 133 together in a consecutive linear manner, with one apex 133 connecting to the next, where thread used in the stitching forms the central core element of the toy. In the example of FIG. 22, the armor plates 132 are again connected to one another at their apexes 133 which each includes an opening to receive a threading member 134. As shown, the threading member 134 is routed through the openings in the apexes 133 of the armor plates 132, and the threading member may be crisscrossed, folded or knotted to provide a desired connection rigidity and sequence for the armor plates 132. In the example of FIG. 23, a base armor plate 136 is provided, and a plurality of other armor plates 138 are connected to the base armor plate 136 by threading the apex 140 of the base member 136 through openings 141 formed in the apexes of the other armor plates 138. In this regard, each of the armor plates 136 and 138 may have the same shape with an apex and an opening formed in the apex as illustrated. Alternatively, the base armor plate 136 could be a larger plate with a more robust apex structure.

Figure 24:
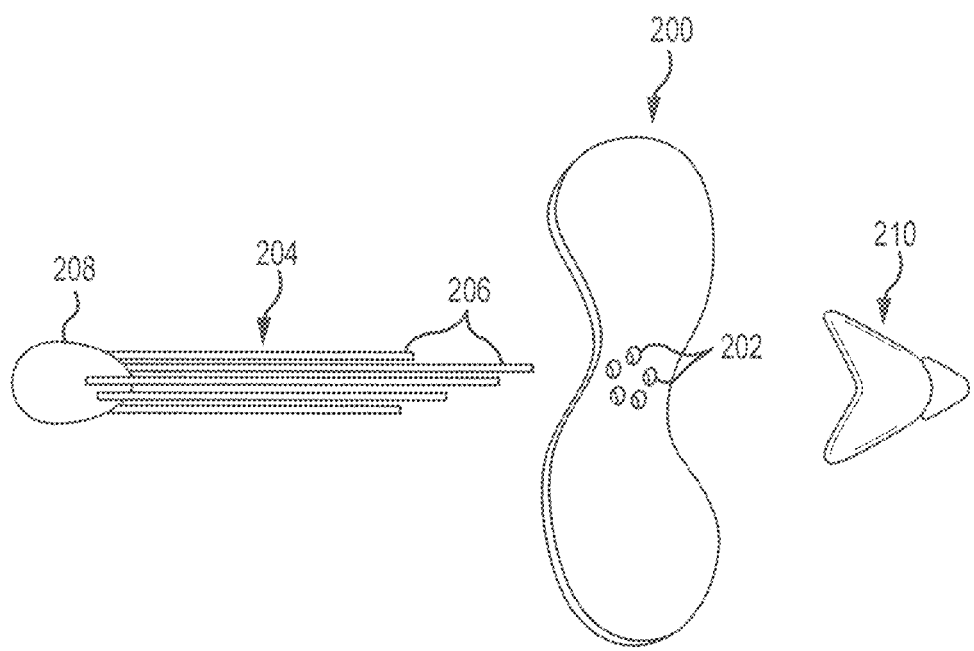
FIG. 24 illustrates one example construction method of the invention in which the central core comprises a plurality of spine elements and armor plates comprise a corresponding number of holes to receive the spine elements.
Figure 25:
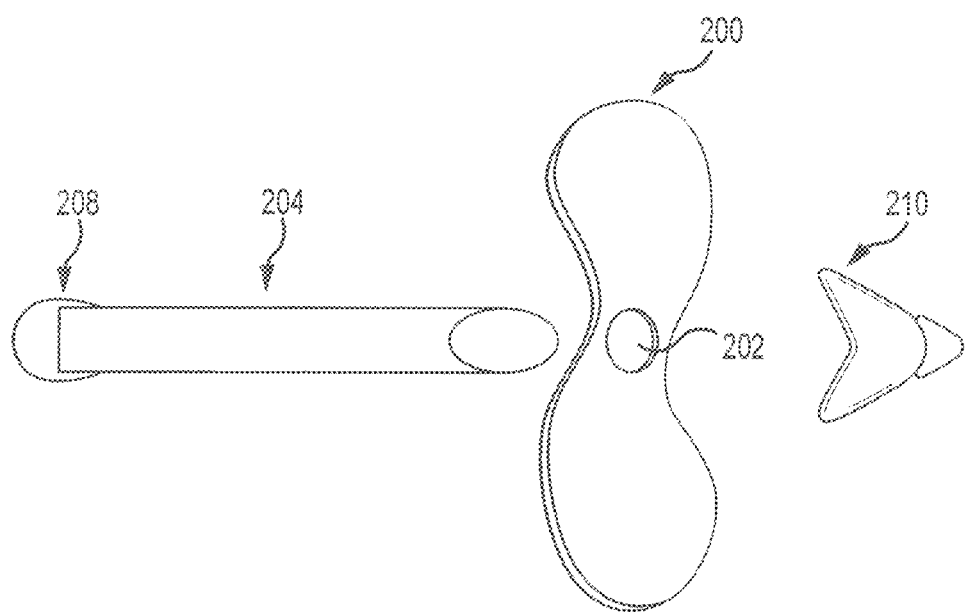
FIG. 25 illustrates another example construction method of the invention in which the central core comprises a single spine element and armor plates that comprise a single hole to receive the spine element.
Figure 26:
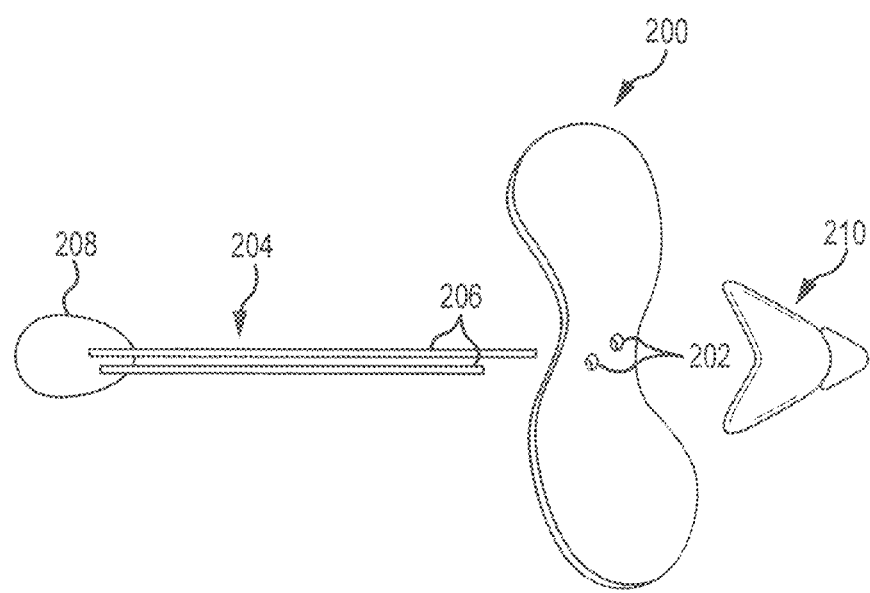
FIG. 26 illustrates an example construction method similar to FIG. 24, differing only in the number of spine elements in the corresponding number of holes in the armor plates to receive the spine elements.

Referring to FIGS. 24-26, these are provided as additional examples of construction methods in which the central core or central spine may comprise a single member or a plurality of members. Accordingly, the armor plates each have a corresponding number of openings to receive the single or plurality of central core/central spine members. More specifically, FIG. 24 shows an armor plate 200 with a plurality of central openings 202 which receive a central core member 204 having a plurality of central threading members 206 secured at respective first ends to a first end member or block 208. Armor plate 200 is threaded on central threading members 206 and shape washer 210 is then threaded on central threading members 206. Shape washer 210 may be used every other threading step, or after a series of multiple armor plates 200 are installed on central threading members 206. FIG. 25 shows the central core member 204 as a single, larger piece and the armor plate 200 has a single central opening 202. FIG. 26 is similar to FIG. 24, the difference being in the number of threading members 206 and corresponding central openings 202.

Figure 27:
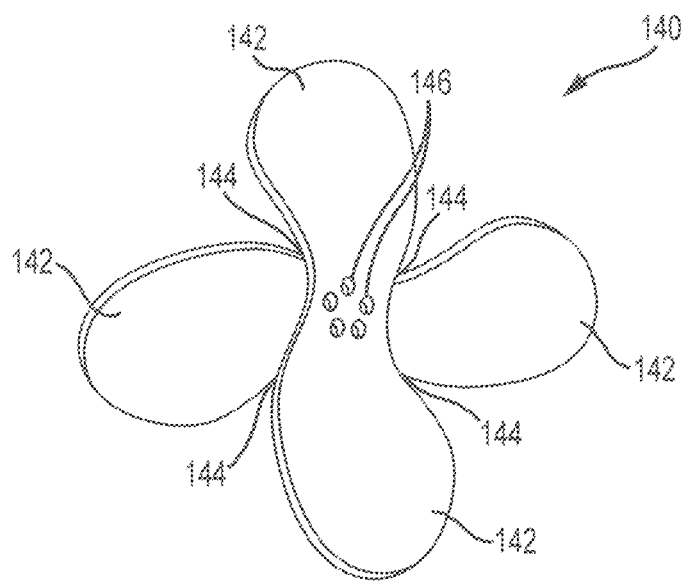
FIG. 27 is a plan view of an example armor plate having a plurality of openings.
Figure 28:
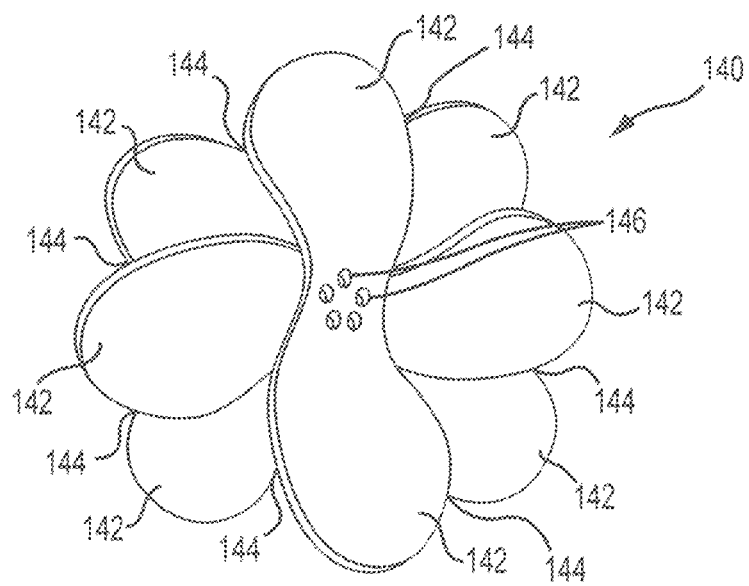
FIG. 28 is another plan view illustrating a plurality of armor plates with the design of FIG. 27 which are assembled to therefore produce a partial overlap between adjacent armor plates.

Referring to FIGS. 27 and 28, these are provided as additional examples of shapes for armor plates 140 and how the armor plates are assembled to provide overlapping layers of materials. As shown, an armor plate includes a plurality of petals 142 that when assembled with other plates form a plurality of recesses 144 between adjacent petals 142. Central openings 146 are provided to receive a central core or spine (not shown). In order to achieve the particular overlapping configuration shown in FIG. 28, each successive armor plate is rotated upon its mounting on the central core so that the recesses 144 between two underlying petals 142 are covered with the petals 142 of the next overlying armor plate. As each successive armor plate is added to the armor section to be constructed, the armor plates for each are rotated again to cover the corresponding recesses.

Figure 29:
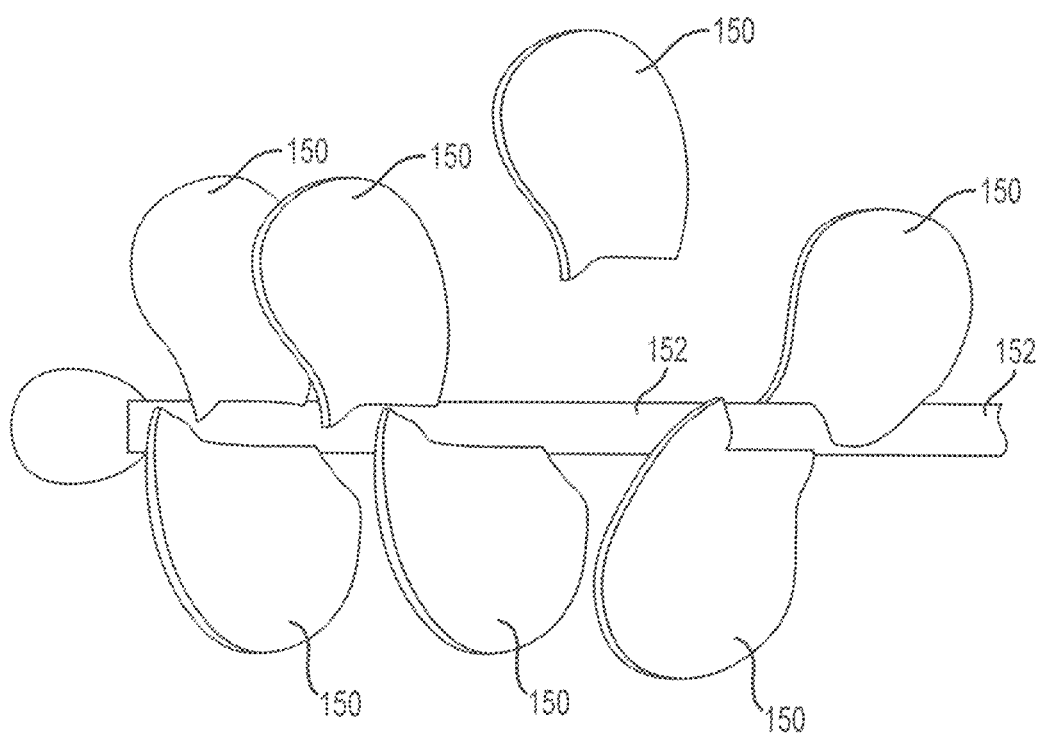
FIG. 29 illustrates another embodiment of the invention in which a plurality of similar shaped armor plates is secured to a single core element or spine.

FIG. 29 illustrates yet another arrangement for armor plates. In this example, the plates 150 may be considered as single petals, and the petals are arranged and secured around a single central core element 152. An adequate number of plates 150 are secured to the core element 152 such that there is a multiple layered configuration achieved. More or fewer petals can be mounted to achieve a desired density of petals and a desired degree of overlap over a given length of the core element.

Figure 30:
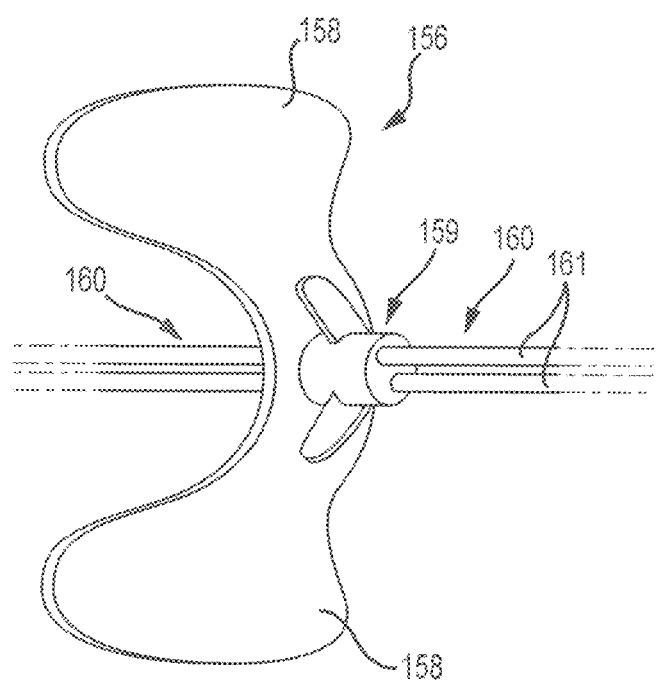
FIG. 30 is a perspective view of another example of an armor plate and a shaped washer, both mounted over a central spine.

FIG. 30 illustrates another example construction in which there is an armor plate 156 having two petals 158. A shape washer 159 is also illustrated with the plate 156 and washer 159 secured to a central spine 160 having two extension or threading elements 161.

Figure 31:
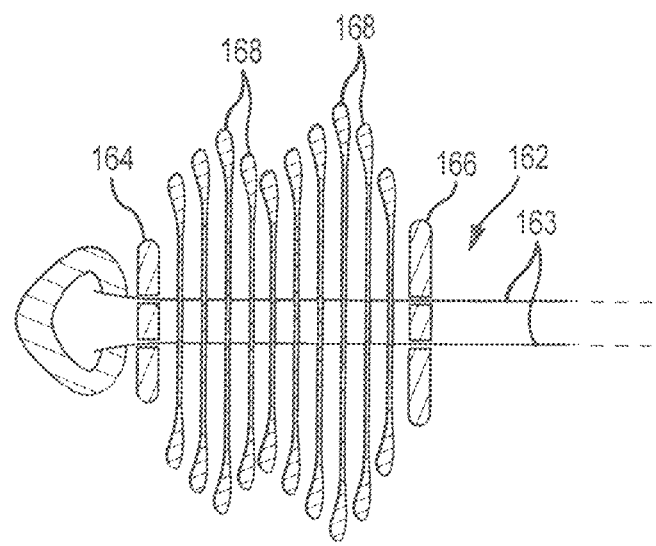
FIGS. 31 and 32 are schematic cross sections illustrating different shapes and orientations with respect to armor plates, washers, and the manner in which these may be mounted over a core spine having two extensions.

FIG. 31 illustrates another example construction in cross-section in which the pet toy includes a central spine 162 with two threading elements 163. Top and bottom blocks 164 and 166 hold a plurality of armor plates on the spine 162. FIG. 31 particularly illustrates the spacing of the armor plates 168, and how overlapping of the plates may be achieved with the plates having different diameters.

Figure 32:
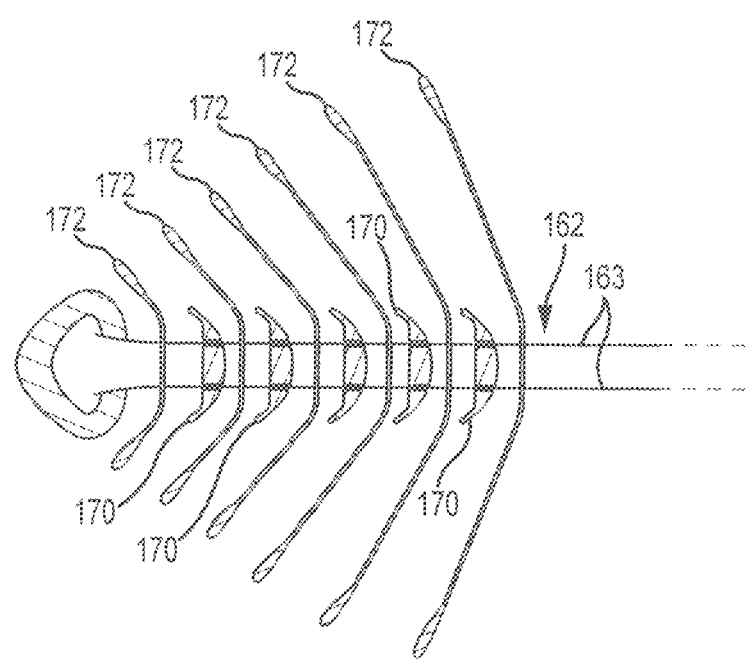

FIG. 32 illustrates yet another example construction in cross-section in which the pet toy includes the central spine 162 with two extension or threading elements, along with use of shape washers 170 which influence the orientation or angular extension of the armor plates 172. The peripheral edges of the washers are curved to influence the plates in the same general direction or orientation; that is, the armor plates 172 are generally curved in the same orientation and are prevented from bending in the opposite direction. Although gaps are shown in this figure between the washers and plates, it should be understood that the plates can be thicker and/or spacing of the washers can be smaller between the plates such that the plates may come into contact with the washers.

Figure 33:
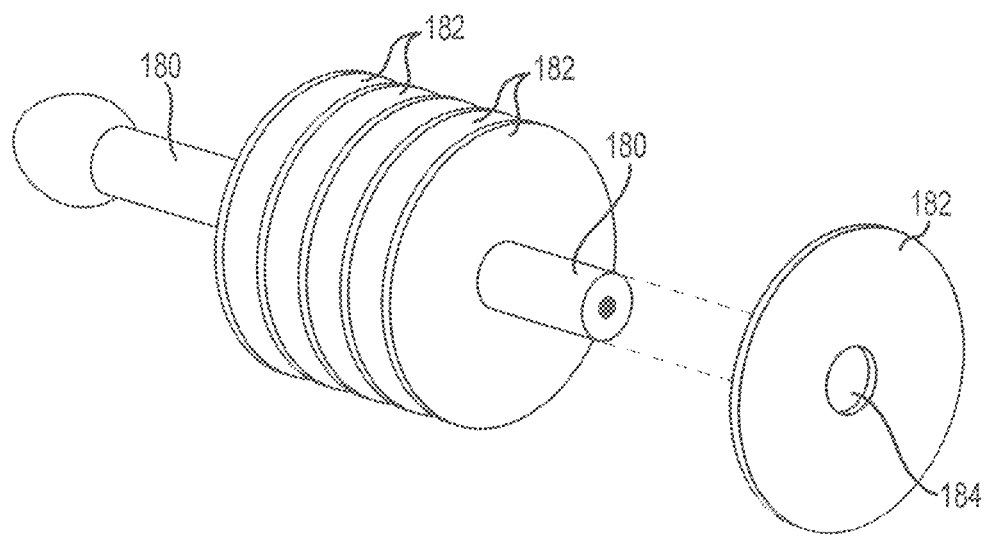
FIG. 33 illustrates another preferred embodiment of the invention in which a single core spine is used to mount circular shaped armor plate elements of selected diameters.

FIG. 33 illustrates another example construction for an armored section. Specifically, this figure illustrates a single central core element 180 and a plurality of substantially uniform shaped armor plates 182. As shown, the armor plates 182 are illustrated as circular or oval shaped with a central opening 184 to receive the central core 180. Central core element 180, may be shaped in any manner to represent the body of an animal, creature, whimsical character, etc.

Figure 34:
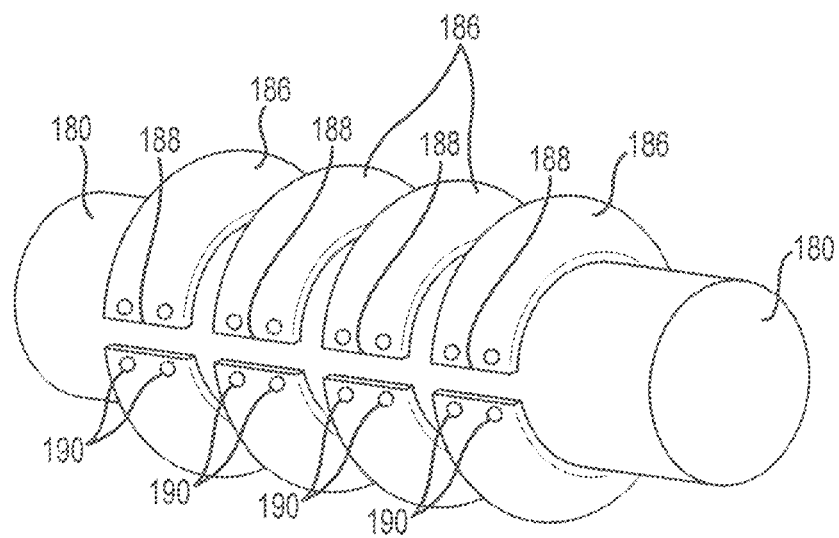
FIG. 34 illustrates yet another preferred embodiment of the invention, similar to FIG. 33, but the armor plate elements having a different shape.

FIG. 34 illustrates yet another example of the armor plate section, similar to FIG. 33, however the armor plates 186 do not completely close around the central core 180. Rather, the plates 186 are divided or cut along lines 188. Further, the plates 186 including a plurality of holes or opening 190. These openings may receive one or more threading members (not shown). Therefore, in this example, the plates may be differently spaced from one another, and may be more tightly or loosely held around the core 180, depending upon how the threading members are employed.

Figure 35:
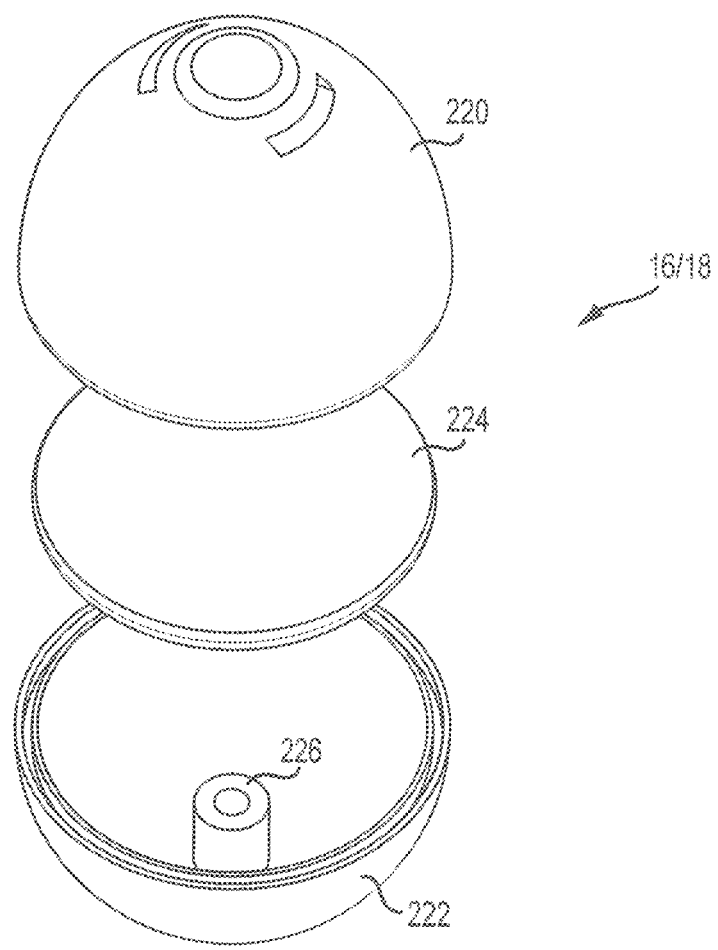
FIG. 35 illustrates an example top or bottom block component that may incorporate a squeaker or other noise making device.

FIG. 35 illustrates another feature of the invention that may be adopted for any of the embodiments, namely, top or bottom blocks 16/18 that include a noise making element such as a squeaker. As shown, the block 16/18 may be constructed in three pieces including an upper half 220, a lower half 222, and an internal divider 224. The lower half 222 has a projection 226 which may receive a squeaker (not shown). In this configuration, the squeaker is protected within the housing 226. The blocks 16/18 may be flexible and elastomeric that enables airflow in and out of the blocks so that the interiorly protected squeaker may be activated by biting or chewing action of an animal.

Figure 36:
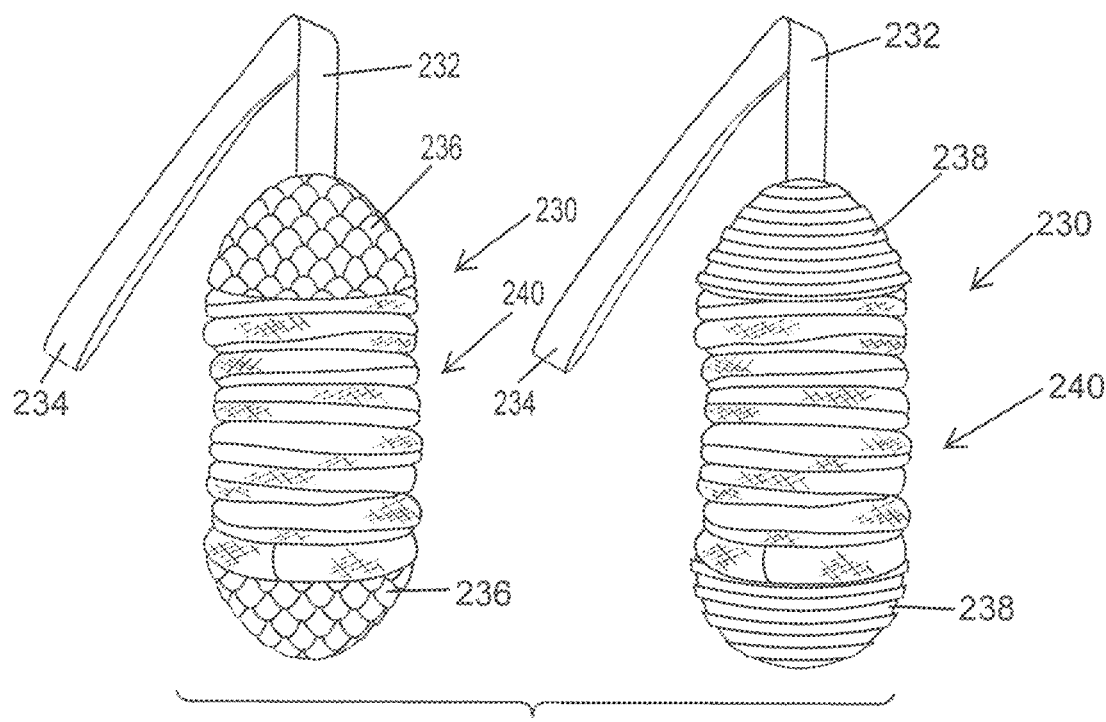
FIG. 36 illustrates another preferred embodiment of the invention showing a pet toy with a plurality of stacked armor plates and top and bottom blocks which form the respective opposite ends of the toy.

FIG. 36 shows yet other embodiments of the invention shown as pet toys 230. In this illustrated embodiment, the central core or spine 232 projects beyond one end of the toy and may be formed in a loop 234 which may enable a pet owner to better grasp and hold the toy. This may also assist in the pet owner in tossing the pet toy or playing tug-of-war with a pet. As also shown, the exterior surface of the pet toy may include various types of armor. For example, the top and bottom blocks of the pet toy may incorporate lamellar type armor sections 236 or layered or stacked armor sections 238. The middle or interior portion of the pet toy may incorporate a stacked arrangement 240 of armor plates. Therefore, it should be understood that a pet toy according to the invention may incorporate more than one type of armor section.

Figure 37:
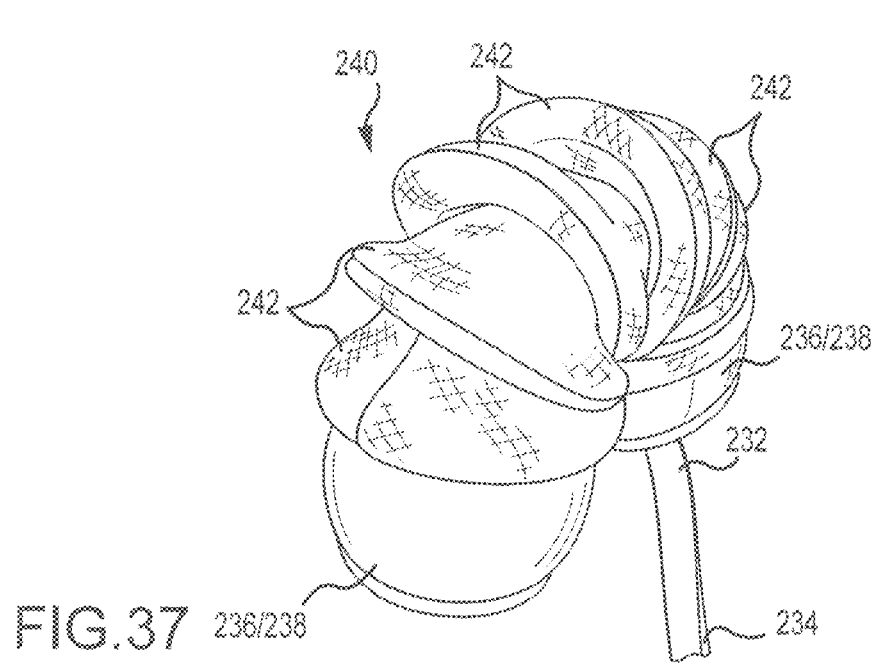
FIG. 37 illustrates the pet toy of FIG. 36 when bent or deformed and showing the particular arrangement of the armor plates.

Referring to FIG. 37, this figure illustrates the overlapping and stacked arrangement of adjacent armor plates, such as shown in the embodiments of FIG. 36. More specifically, the stacked arrangement 240 may comprise a plurality of overlapping armor plates 242 in which the armor plates 242 are stacked upon one another, and are made of flexible material such that when the pet toy is deformed, at least some portion of the adjacent armor plates 242 still overlap one another thereby providing enhanced protection for the toy because of the existence of multiple layers of material.

Figure 38:
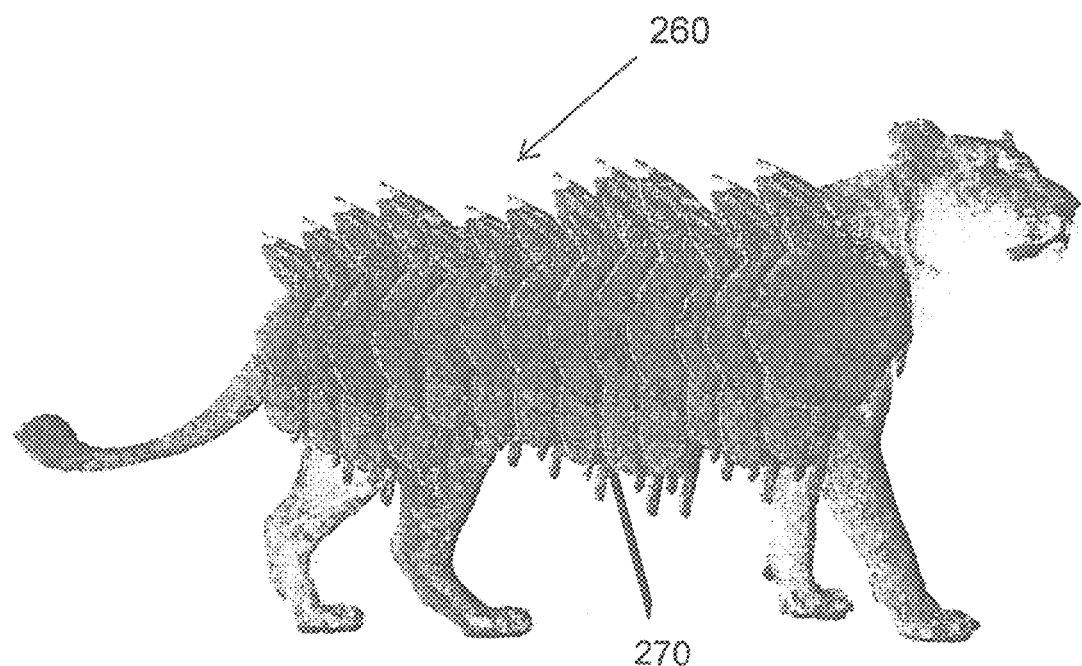
FIG. 38 illustrates the pet toy in the shape of a four-legged animal such as a lion.
Figure 39:
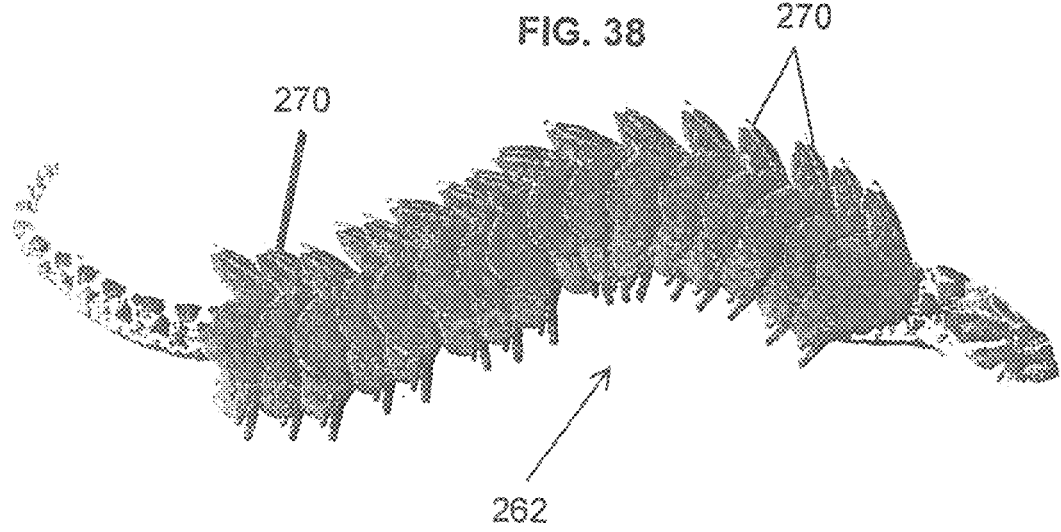
FIG. 39 illustrates the pet toy in the shape of a reptile such as a snake.
Figure 40:
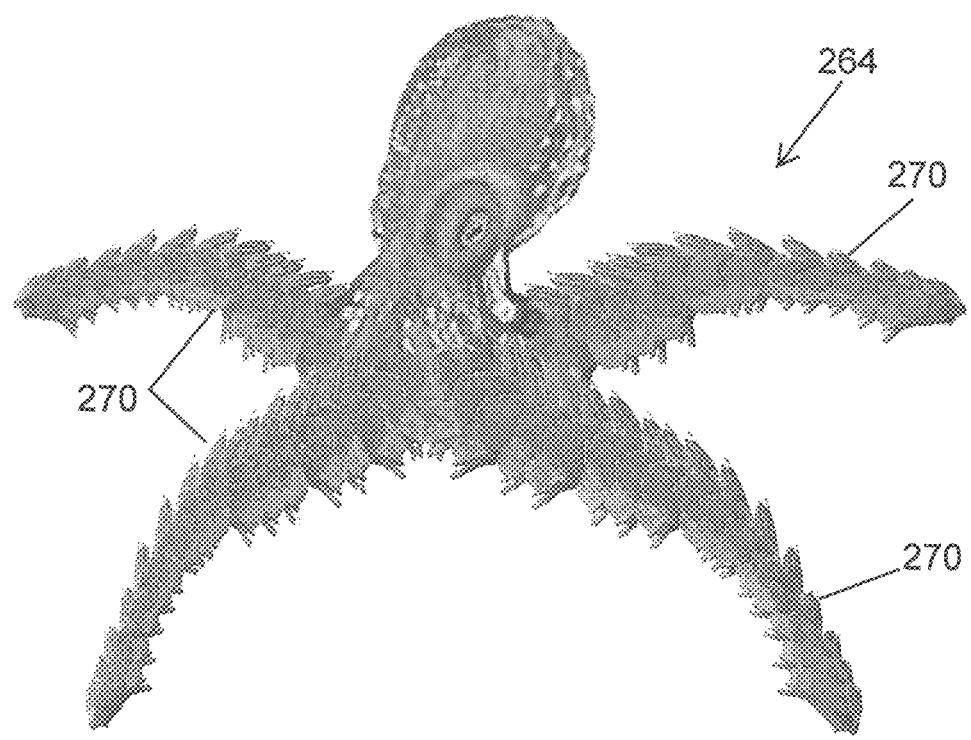
FIG. 40 illustrates the pet toy in the shape of an aquatic animal such as an octopus.
Figure 41:
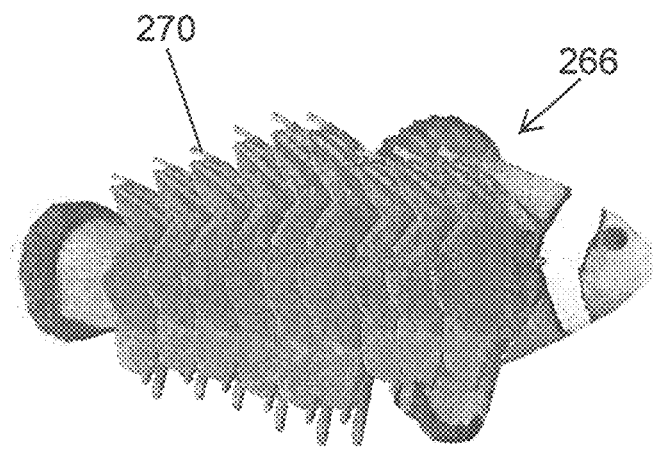
FIG. 41 illustrates the pet toy in the shape of another aquatic animal such as a fish.

FIGS. 38-41 illustrate other embodiments of the invention in the shape of different animals. Specifically, FIG. 38 illustrates a pet toy in the shape of a lion 260; FIG. 39 illustrates a pet toy in the shape of a snake 262; FIG. 40 illustrates a pet toy in the shape of an octopus 264; and FIG. 41 illustrates a pet toy in the shape of a fish 266. For each of these embodiments, some portion of the body or appendages of the animal include an armor section 270. By a review of these embodiments, one can appreciate the diverse ways in which armor sections may be incorporated on a pet toy to replicate desired features of the animal. Each of the armor plates may be sized and shaped so to correspond to the particular portion of the animal which is to be replicated.

Figure 42:
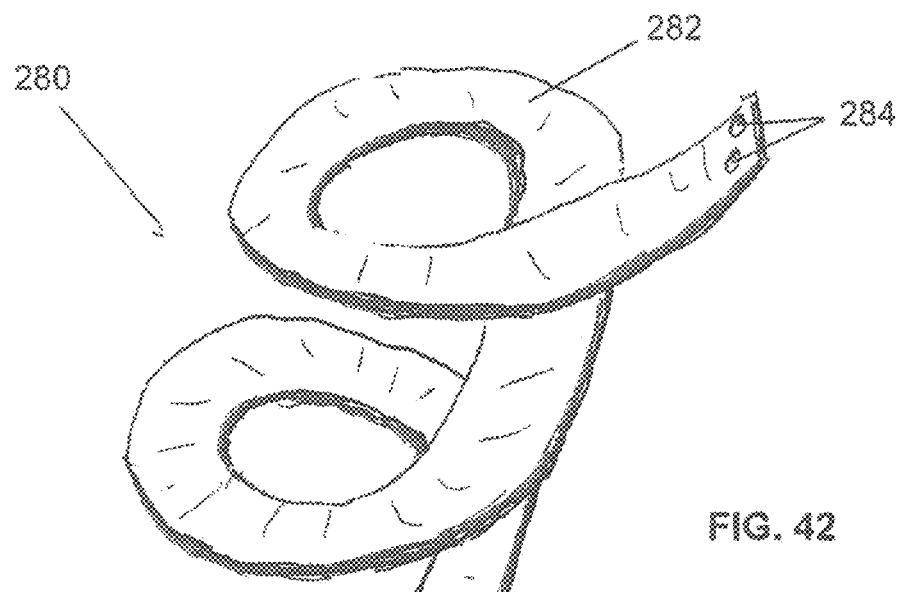
FIG. 42 illustrates another example construction of a method of the invention in which a helical pattern of material is used to create an armor section.
Figure 43:
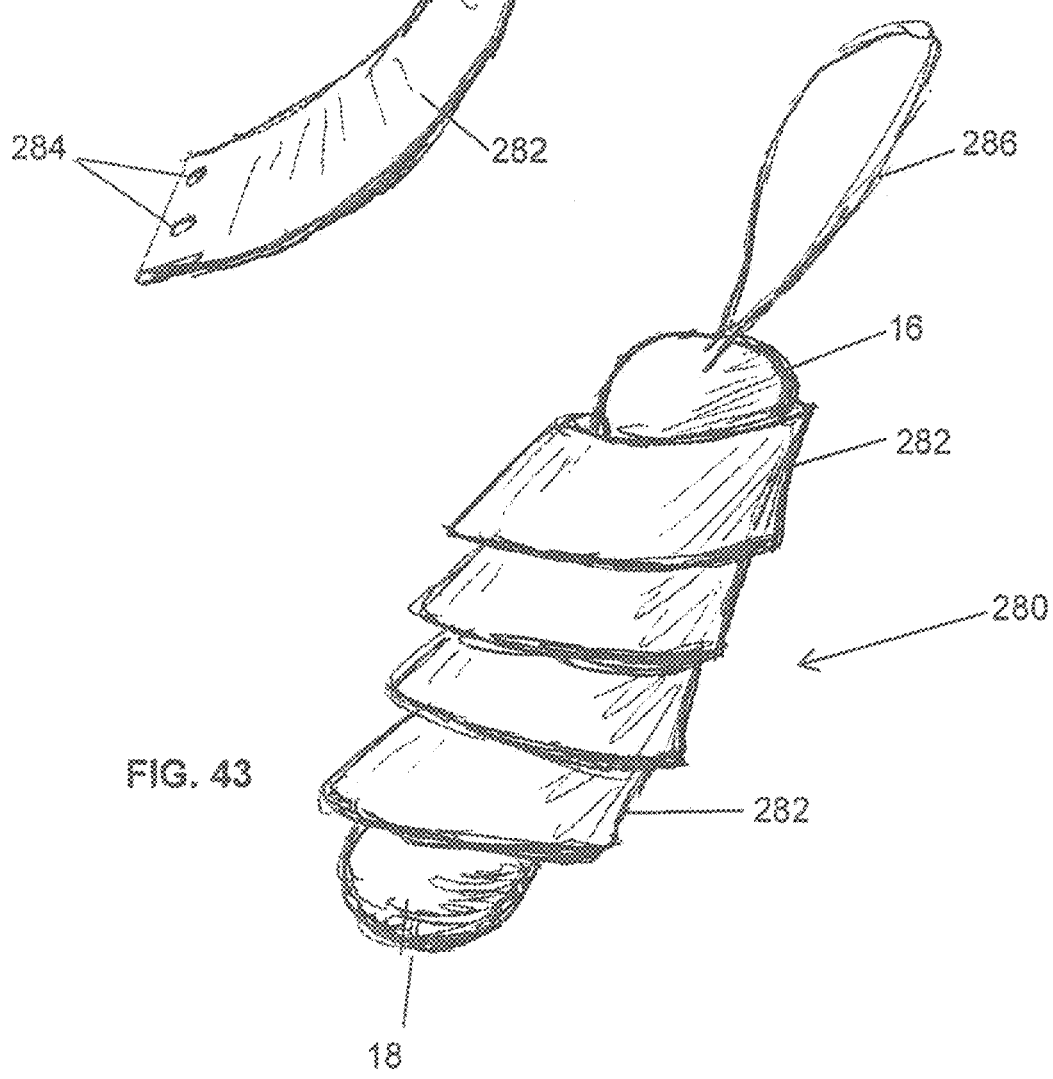
FIG. 43 illustrates another embodiment of the pet toy of the invention that incorporates a helical armor section.

FIGS. 42 and 43 illustrate yet another method of making an armor section to include a pet toy made according to the method. As shown, and armor section 280 can be made from a single piece of material 282 in which the material is configured in a "corkscrew" or helical arrangement. FIG. 42 shows how the material 280 may be manipulated to commence a helical pattern which may traverse the body of the pet toy over a desired length. The ends of the material 282 may include openings or holes 284 which may serve as attachment points for securing the material as by stitches, staples, etc. Material 282 may also be attached to the body by stitching, tacking or stapling the inner edge of material 282 to the body of the pet toy. Referring to FIG. 43, a pet toy is illustrated incorporating the armor section 280 in which the material 282 is provided in a helical configuration, extending over the body of the pet toy. Upper and lower blocks 16 and 18 may be provided as end holding elements. The pet toy may further include a central core in which one end thereof protrudes beyond an end of the pet toy, shown as a looped cord or handle 286. Although one layer of material 282 is shown, more than one layer of material can be provided in a helical pattern therefore providing a thicker, denser concentration of material for the armor feature of the pet toy. Each successive layer of material may completely or partially overlap an underlying layer of material.

While the invention has been set forth with respect to one or more preferred embodiments, it should be understood that the invention is not limited to these preferred embodiments and the claims are intended to cover all equivalents thereof. Further, it is contemplated that the invention can be modified or changed commensurate with the scope of the claims appended hereto.

What is claimed is:

1. A pet toy comprising:
a body having an armor section, said armor section including a plurality of armor plates;
a central core element extending through said body and oriented in a longitudinal direction; and
wherein said armor plates are successively secured to said core element thereby arranging said armor plates in a stacked, offset arrangement and such that said armor plates extend in said longitudinal direction;
each of said armor plates having a plurality of petals and recesses formed between pairs of petals wherein petals of one overlying armor plate partially overlap petals or recesses of an adjacent underlying armor plate thereby presenting a layered configuration relative to a direction perpendicular to said longitudinal direction; and
wherein the plurality of petals are spaced circumferentially from one another.

2. A pet toy, as claimed in claim 1, further including:
at least one retaining block for securing one end of said armor section to said core element.

3. A pet toy, as claimed in claim 1, wherein:
said armor plates further include a center area with at least one opening to receive said central core element.

4. A pet toy, as claimed in claim 1, wherein:
said central core element includes a plurality of spines each extending in the longitudinal direction.

5. A pet toy, as claimed in claim 1, wherein:
said central core element is a flexible elongate member.

6. A pet toy, as claimed in claim 1, wherein:
said central core element is a body member made from a flexible material.

7. A pet toy, as claimed in claim 1, wherein:
said armor plates are arranged to form a substantially tubular shape in which the armor plates circumferentially surround a selected length of said body.

8. A pet toy, as claimed in claim 1, wherein:
said armor plates are arranged to form a toy with a body and shape of an animal, creature or whimsical character, where the armor plates circumferentially surround a selected length of said body.

9. A pet toy, as claimed in claim 1, wherein:
said body further includes at least one shape washer connected to said central core element and placed between two armor plates.

10. A pet toy, as claimed in claim 9, wherein:
said shape washer has a curved shape to induce alignment of said armor plates in a desired orientation.

11. A pet toy, as claimed in claim 1, further including:
at least one accessory secured to said pet toy, said accessory being made of a selected material to supplement said body.

12. A pet toy, as claimed in claim 1, wherein:
said central core element includes a directionally restricted element enabling advancement of said armor plates in a single direction and to prevent said armor plates from being advanced in an opposite direction when assembled to said central core element.

13. A method of entertaining an animal with a pet toy, comprising:
providing a pet toy comprising:
a) a body having an armor section, said armor section including a plurality of armor plates;
b) a central core element extending through said body and oriented in a longitudinal direction; and
c) at least one retaining block for securing one end of said armor section to said core element; wherein said armor plates are successively secured to said core element thereby arranging said armor plates in a stacked arrangement such that said armor plates extend in said longitudinal direction, each of said armor plates having a plurality of petals and recesses formed between pairs of petals, wherein petals of one overlying armor plate partially overlap petals or recesses of an adjacent underlying armor plate thereby presenting a layered configuration relative to a direction perpendicular to said longitudinal direction, and said petals being circumferentially spaced from one another; and
giving the pet toy to an animal wherein potential damage to the toy caused by the biting action of the animal's mouth on the body is reduced by the plurality of armor plates.

14. A method, as claimed in claim 13, wherein:
said armor plates further include a center area with at least one opening to receive said central core element.

15. A method, as claimed in claim 13, wherein:
said central core element includes a plurality of spines each extending in the longitudinal direction.

16. A method, as claimed in claim 13, wherein:
said central core element is a flexible elongate member.

17. A method, as claimed in claim 13, wherein:
said armor plates are arranged to form a substantially tubular shape in which the armor plates circumferentially surround a selected length of said body.

18. A method, as claimed in claim 13, wherein:
said body further includes at least one shape washer connected to said central core element and placed between two armor plates.

19. A pet toy comprising:
a body having an armor section, said armor section including a plurality of armor plates extending in a longitudinal direction along an axis of said body, each of said armor plates having at least one protrusion such that when said pet toy is assembled, said armor section presents a multiple layers of material on an exterior surface of said pet toy as formed by a protrusion of one overlying armor plate overlapping at least a portion an adjacent underlying armor plate thereby presenting a layered configuration relative to a direction perpendicular to said longitudinal direction, said at least one protrusion including a plurality of petals spaced circumferentially from one another;
a central spine extending through said body and oriented to secure said armor plates thereto; and
wherein said armor plates are secured to said central spine thereby arranging said armor plates in a configuration to extend said armor section along a predetermined length of said body and to circumferentially surround said body a predetermined angular coverage.

20. A pet toy, as claimed in claim 19, further including:
at least one retaining block attached to said central spine and arranged to secure one end of said armor section to said central spine.

21. A pet toy, as claimed in claim 19, wherein:
said armor plates further include a center area with at least one opening to receive said central spine.

22. A pet toy, as claimed in claim 19, wherein:
said central spine includes a plurality of spines each extending in the longitudinal direction.

23. A pet toy, as claimed in claim 19, wherein:
said central spine is a flexible elongate member.

24. A pet toy, as claimed in claim 19, wherein:
said armor plates are arranged to form a substantially tubular shape in which the armor plates circumferentially surround a selected length of said body.

25. A pet toy, as claimed in claim 19, wherein:
said body further includes at least one shape washer connected to said central spine and placed between two adjacent armor plates.

26. A pet toy, as claimed in claim 25, wherein:
said shape washer has a curved shape to induce alignment of said armor plates in a desired orientation.

27. A pet toy, as claimed in claim 19, further including:
at least one accessory secured to said pet toy, said accessory being made of a selected material to supplement said body.

28. A pet toy, as claimed in claim 19, wherein:
said central spine includes a directionally restricted element enabling advancement of said armor plates in a single direction and to prevent said armor plates from being advanced in an opposite direction when assembled to said central spine.

29. A pet toy, as claimed in claim 19, further comprising a retaining block secured to the central spine.

30. A pet toy, as claimed in claim 29, wherein the retaining block has a hallow interior with a housing for a noise-maker therein.

31. A pet toy, as claimed in claim 19, wherein the armor plates have a hoop shape which an outer surface that increases in diameter towards one direction.

32. A pet toy, as claimed in claim 31, wherein the outer surface of the armor plates is closed.

33. A pet toy, as claimed in claim 19, wherein a first armor plate of the plurality of armor plates is secured to a second armor plate of the plurality of armor plates.

34. A pet toy, as claimed in claim 19, wherein a plurality of secondary armor plates are secured to at least one of the plurality of armor plates.

35. A pet toy, as claimed in claim 19, wherein a first armor plate of the plurality of armor plates has a different diameter than a second armor plate of the plurality of armor plates.

36. A pet toy, as claimed in claim 1, further comprising:
a second armor section wrapped around a portion of said body, wherein ends of said second armor section are secured to said body.

37. A pet toy, as claimed in claim 36, wherein an interior edge of said second armor section is secured to said body.

38. A pet toy, as claimed in claim 2, wherein said retaining block includes a first portion joined to a second portion, the second portion including a housing for a squeaker that makes noise in response to an animal biting or chewing on said pet toy.

39. A pet toy, as claimed in claim 1, wherein said core element projects beyond an end of said body to form a loop or a handle.

* * * * *